(12) United States Patent
Bourne et al.

(10) Patent No.: US 7,502,945 B2
(45) Date of Patent: Mar. 10, 2009

(54) USING A FLEXIBLE RIGHTS TEMPLATE TO OBTAIN A SIGNED RIGHTS LABEL (SRL) FOR DIGITAL CONTENT IN A RIGHTS MANAGEMENT SYSTEM

(75) Inventors: Steven Bourne, Seattle, WA (US); Marco A. DeMello, Bellevue, WA (US); Jason Cahill, Carnation, WA (US); Lauren Antonoff, Seattle, WA (US); Chandramouli Venkatesh, Redmond, WA (US); Prashant Malik, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 878 days.

(21) Appl. No.: 10/793,997

(22) Filed: Mar. 5, 2004

(65) Prior Publication Data

US 2004/0243819 A1 Dec. 2, 2004

Related U.S. Application Data

(63) Continuation-in-part of application No. 10/185,278, filed on Jun. 28, 2002.

(51) Int. Cl.
*G06F 7/04* (2006.01)
*G06F 11/30* (2006.01)
*H04K 1/00* (2006.01)
*G06F 1/00* (2006.01)
*G06F 21/00* (2006.01)
*G06F 21/24* (2006.01)
*G06F 17/00* (2006.01)

(52) U.S. Cl. ............................ 713/193; 726/27; 705/59
(58) Field of Classification Search .................. 713/193; 726/27; 705/59
See application file for complete search history.

(56) References Cited

U.S. PATENT DOCUMENTS 5,715,403 A 2/1998 Stefik ......................... 395/244

(Continued)

FOREIGN PATENT DOCUMENTS

WO WO 00/58811 10/2000

(Continued)

OTHER PUBLICATIONS

G. Rouvroy, F.-X. Standaert, F. Lefèbvre, J.-J. Quisquater, B. Macq, J.-D. Legat, "Reconfigurable hardware solutions for the digital rights management of digital cinema", Oct. 2004, DRM '04: Proceedings of the 4th ACM workshop on Digital rights management, ACM, pp. 40-53.*

(Continued)

*Primary Examiner*—Emmanuel L Moise
*Assistant Examiner*—Courtney D Fields
(74) *Attorney, Agent, or Firm*—Woodcock Washburn LLP

(57) ABSTRACT

Content is encrypted according to a content key (CK) to result in (CK(content)) and the content key (CK) is protected according to a public key for a license server (PU-RM). Rights data is retrieved from a rights template to be associated with the content, and rules for modifying the retrieved rights data are also retrieved from the retrieved rights template. The retrieved rights data from the rights template is modified according to the rules, and the rights data and the protected content key (CK)) are submitted as a rights label to the license server for signing thereby. The license server thus validates the rights label and, if valid, creates a digital signature based on a private key (PR-RM) corresponding to (PU-RM) and based at least in part on the rights data to result in a signed rights label (SRL), and returns the SRL.

11 Claims, 13 Drawing Sheets

U.S. PATENT DOCUMENTS

| | | | |
|---|---|---|---|
| 6,226,618 B1 | 5/2001 | Downs et al. | 705/1 |
| 7,073,063 B2 * | 7/2006 | Peinado | 713/171 |
| 2002/0013772 A1 | 1/2002 | Peinado | 705/51 |
| 2004/0001594 A1 * | 1/2004 | Krishnaswamy et al. | 380/277 |
| 2004/0054678 A1 | 3/2004 | Okamoto et al. | |

FOREIGN PATENT DOCUMENTS

| | | |
|---|---|---|
| WO | WO 00/59150 | 10/2000 |
| WO | WO 01/52021 A1 | 7/2001 |
| WO | WO 02/01335 A2 | 1/2002 |
| WO | WO 02/23315 A2 | 3/2002 |
| WO | WO 2006/065012 A1 * | 6/2006 |

OTHER PUBLICATIONS

Griswold, G.N. "A Method for Protecting Copyright on Networks", *IMA Intellectual Property Project Proceedings*, 1994, 1(1), 169-178.

Kahn, R.E. "Deposit, Registration and Recordation in an Electronic Copyright Management System", *IMA Intellectual Property Project Proceedings*, 1994, 1(1), 111-120.

\* cited by examiner

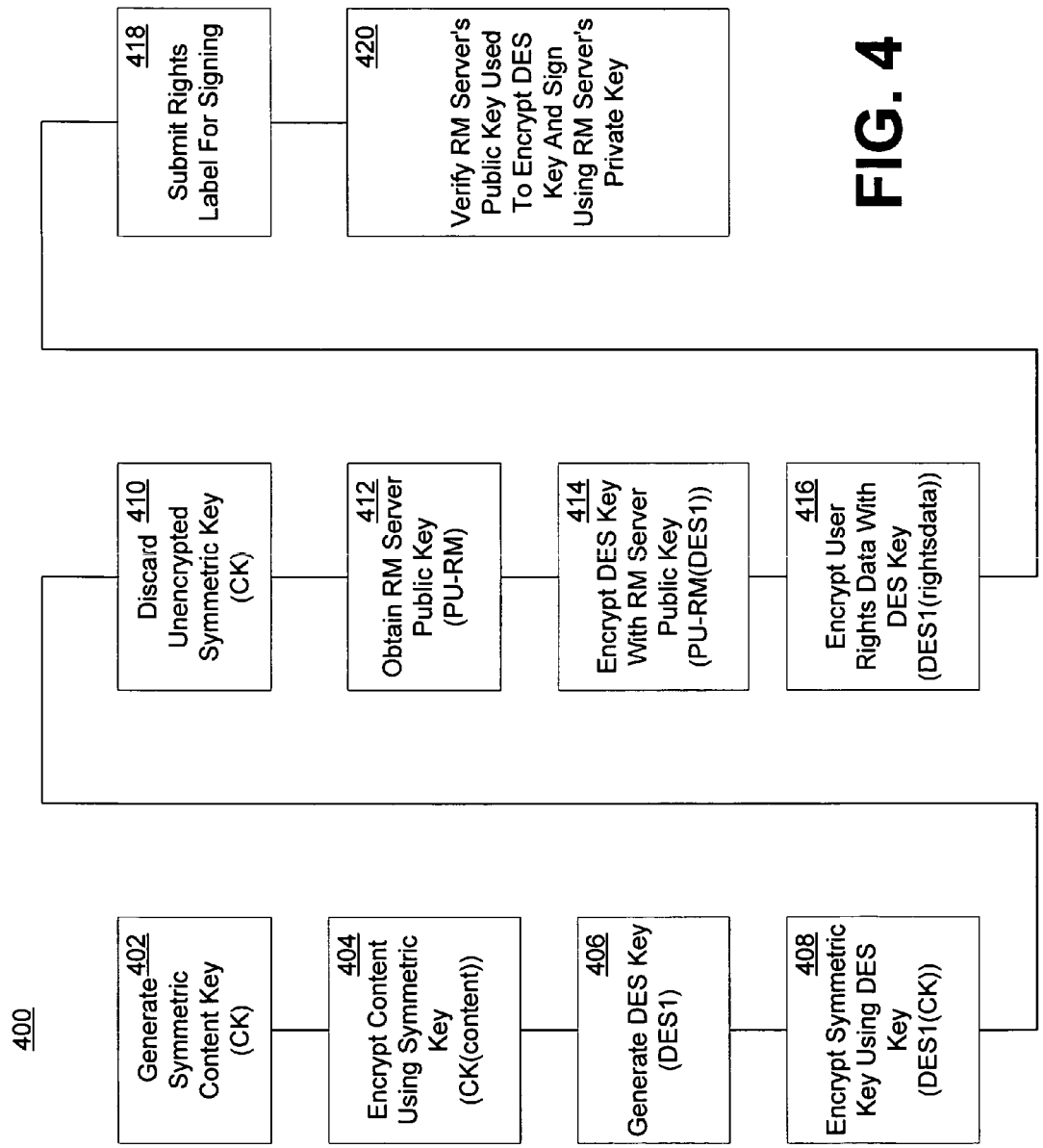

| SRL 308 | CONTENT INFO | RM SERVER INFO | -(PU-RM(DES1)) | -REFERRAL INFO | --URL | --FALL-BACK | RIGHTS LABEL INFO | (DES1(RIGHTSDATA)) | (DES1(CK)) | S (PR-RM) |

FIG. 4A

| RIGHTS TEMPLATE 900 | RIGHTS DATA | RM SERVER INFO | - (PU-RM) | - REFERRAL INFO | - - URL | - - FALL-BACK | RIGHTS TEMPLATE INFO | S (PR-RM-T) |

FIG. 9

USING A FLEXIBLE RIGHTS TEMPLATE TO OBTAIN A SIGNED RIGHTS LABEL (SRL) FOR DIGITAL CONTENT IN A RIGHTS MANAGEMENT SYSTEM

CROSS-REFERENCE TO RELATED APPLICATIONS

The present application is a continuation-in-part of U.S. patent application Ser. No. 10/185,278, filed Jun. 28, 2002 and hereby incorporated herein by reference in its entirety

TECHNICAL FIELD

This invention relates to a rights management (RM) system. More particularly, the invention relates to steps performed in using a flexible rights template to obtain a signed rights label (SRL) from a license server for a piece of digital content in such a RM system.

BACKGROUND OF THE INVENTION

Rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

In one scenario, a content owner or rights-owner such as an author, a publisher, a broadcaster, etc., wishes to distribute such digital content to each of many users or recipients in exchange for a license fee or some other consideration. In such scenario, then, the content may be a song, an album of songs, a movie, etc., and the purpose of the distribution is to generate the license fees. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

In another scenario, a content developer, such as an employee in an organization, wishes to distribute such digital content to one or more other employees in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration. In such scenario, then, the content may be a document presentation, spreadsheet, database, email, or the like, such as may be exchanged within an office setting, and the content developer may wish to ensure that the content stays within the office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing a rights management and enforcement architecture and method that allows the controlled rendering or playing of arbitrary forms of digital content, where such control is flexible and definable by the content owner/developer of such digital content. More specifically, a need exists for such an architecture that allows and facilitates such controlled rendering, especially in an office or organization environment or the like where documents are to be shared amongst a defined group of individuals or classes of individuals. Even more specifically, a need exists for such an architecture that provides a publisher of digital content within such an environment with a pre-defined template specifying users and rights of such users with respect to such digital content, where the template is flexible in nature.

SUMMARY OF THE INVENTION

The invention satisfies the aforementioned needs in the art by providing systems and methods for publishing digital content to enable a license server to issue a digital license corresponding to the content to one or more users desiring to render the content.

In one method, the content is encrypted according to a content key (CK) to result in (CK(content)) and the content key (CK) is protected according to a public key for the license server (PU-RM). Rights data is retrieved from a rights template to be associated with the content, and rules for modifying the retrieved rights data are also retrieved from the retrieved rights template. The retrieved rights data from the rights template is modified according to the rules, and the rights data and the protected content key (CK)) are submitted as a rights label to the license server for signing thereby. The license server thus validates the rights label and, if valid, creates a digital signature based on a private key (PR-RM) corresponding to (PU-RM) and based at least in part on the rights data to result in a signed rights label (SRL), and returns the SRL.

The returned SRL is received and concatenated with (CK (content)) to form a content package, and the content package is distributed to the one or more users. Thus, a user desiring to render the content retrieves the SRL from the content package and submits the retrieved SRL to the license server as part of a request for the license corresponding to the content. The license server verifies the signature of the SRL based on (PU-RM) and based at least in part on the protected rights data, accesses the rights data in the SRL and reviews same to determine whether the user is entitled to the license, and if so issues the license to the user, where the license includes (CK) in a protected form accessible to the user.

In another method, multiple license servers are enabled to issue a digital license corresponding to the content. In particular, a public key (PUx-RM) of each license server that is to be enabled to issue the license is retrieved from the rights data of the rights template, and the content key (CK) is protected according to the public key for each enabled license server (PUx-RM) to result in (PUx-RM(CK)) for each enabled license server. Thus, the rights data and (PUx-RM(CK)) for each enabled license server are submitted as a rights label to the license server for signing thereby. A user desiring to render the content retrieves the resulting SRL and submits the retrieved SRL to one of the enabled license servers as part of a request for the license corresponding to the content. The enabled license server then verifies the SRL, accesses the rights data in the SRL and reviews same to determine whether the user is entitled to the license, and if so retrieves the (PUx-RM(CK)) from the rights data corresponding to such license server, retrieves (CK) therefrom, and issues the license to the user, where the license includes (CK) in a protected form accessible to the user.

In still another method, an identification of multiple publishing servers are retrieved from the rights data, and one of the multiple publishing servers is selected. Thus, the rights data and the protected content key (CK)) are submitted as a rights label to the selected publishing server for signing thereby.

In yet another method, the rights template is produced by defining within the rights template rights data to be associated with the content and rules for modifying the rights data, and identifying parts of the rights data that are not modified based on the rules. At least some of the identified parts are marked, and the rights template is signed based on the marked parts to produce a digital signature. Thus, a publisher publishing the content may modify the rights data of the template in accordance with the rules but is not expected to modify the marked parts of the template and therefore should not prevent the digital signature from verifying.

BRIEF DESCRIPTION OF THE SEVERAL VIEWS OF THE DRAWING

Other features of the invention are further apparent from the following detailed description of the embodiments of the present invention taken in conjunction with the accompanying drawing.

FIG. 4 provides a flowchart of a preferred embodiment of a method according to the invention for publishing rights managed digital content.

FIG. 4A is a block diagram showing the structure of a signed rights label as produced by the method of FIG. 4.

FIG. 9 is a block diagram showing a rights template specifying information to be incorporated into a rights label in accordance with one embodiment of the present invention.

DETAILED DESCRIPTION OF THE INVENTION

Exemplary Computing Device

Figure 1:
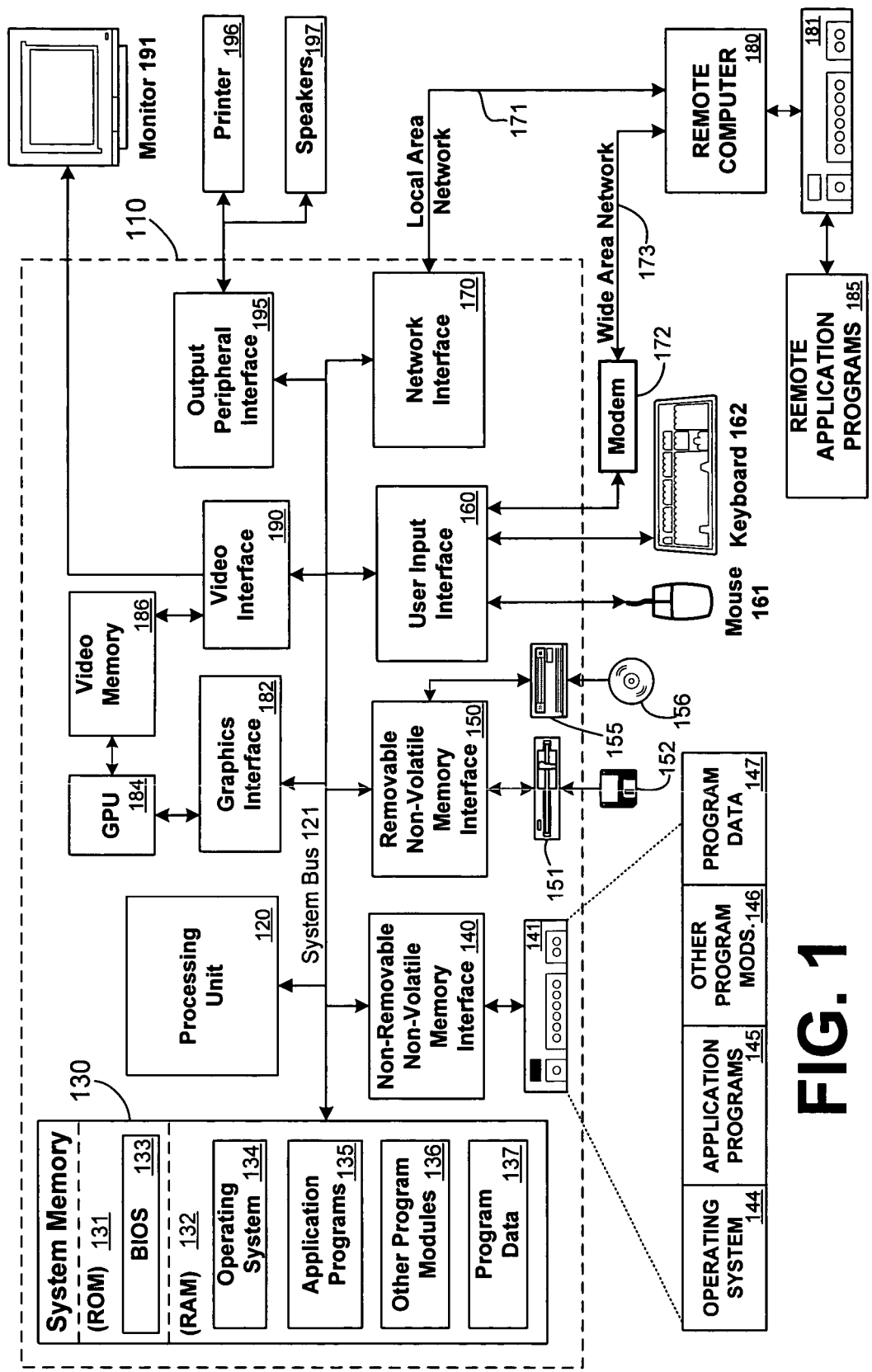
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
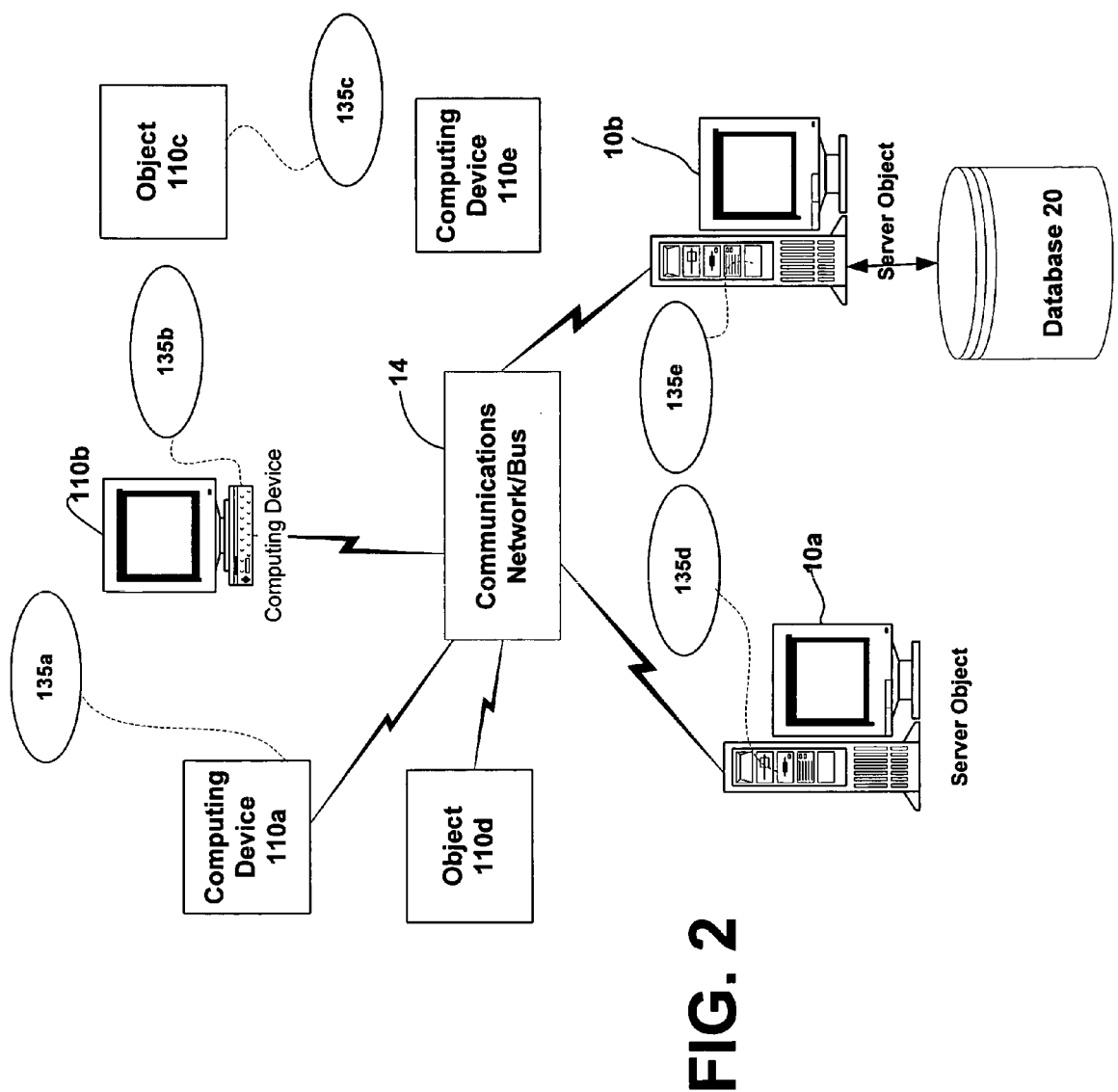
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The Internet commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Rights Management (RM) Overview

Figure 7:
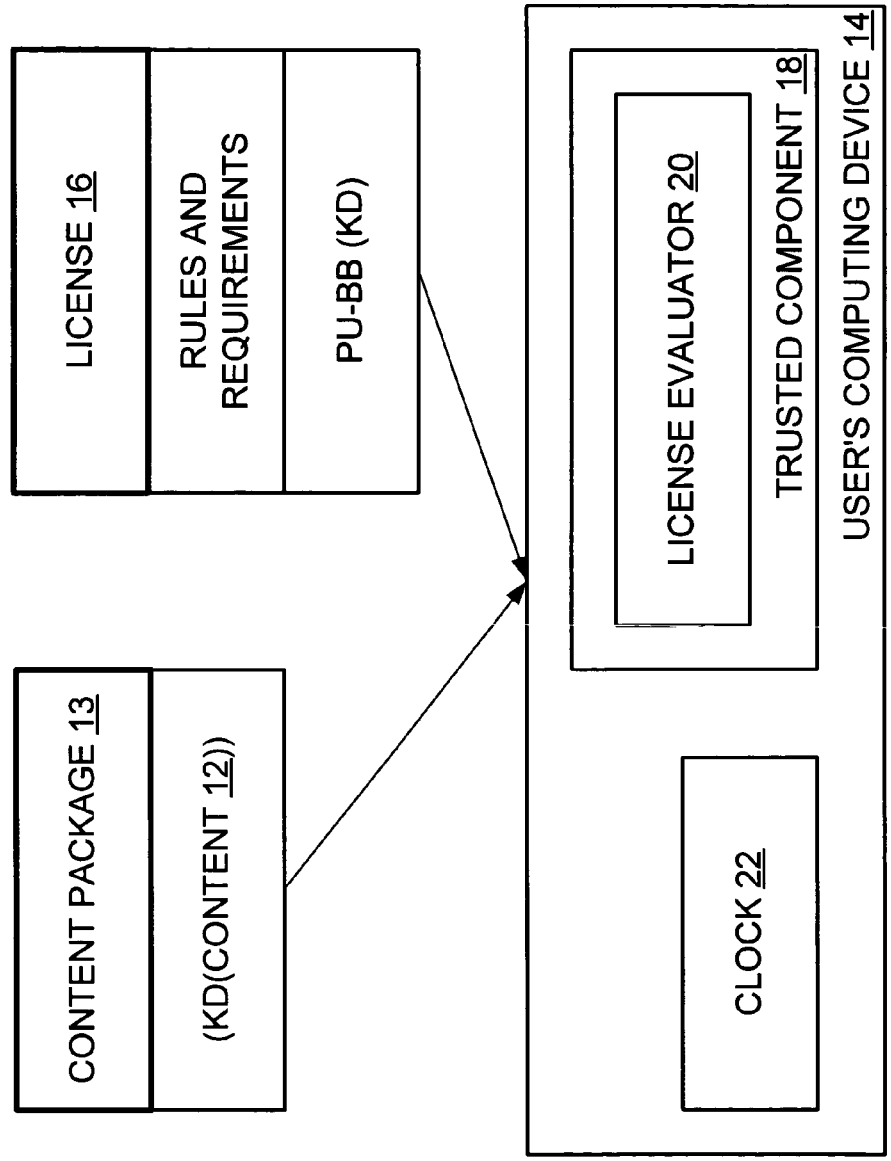
FIG. 7 is a block diagram showing an enforcement architecture of an example of a trust-based system.

As is known, and referring now to FIG. 7, rights management (RM) and enforcement is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 14 or the like.

Typically, a content owner or developer (hereinafter 'owner') distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A RM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based RM system 10 allows an owner of digital content 12 to specify license rules that must be satisfied before such digital content 12 is allowed to be rendered on a user's computing device 14. Such license rules can include the aforementioned temporal requirement, and may be embodied within a digital license 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the RM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the RM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD(CONTENT)) from the content package 13 to result in the actual content 12, and the actual content 12 is then in fact rendered.

Publishing Digital Content

Figure 3:
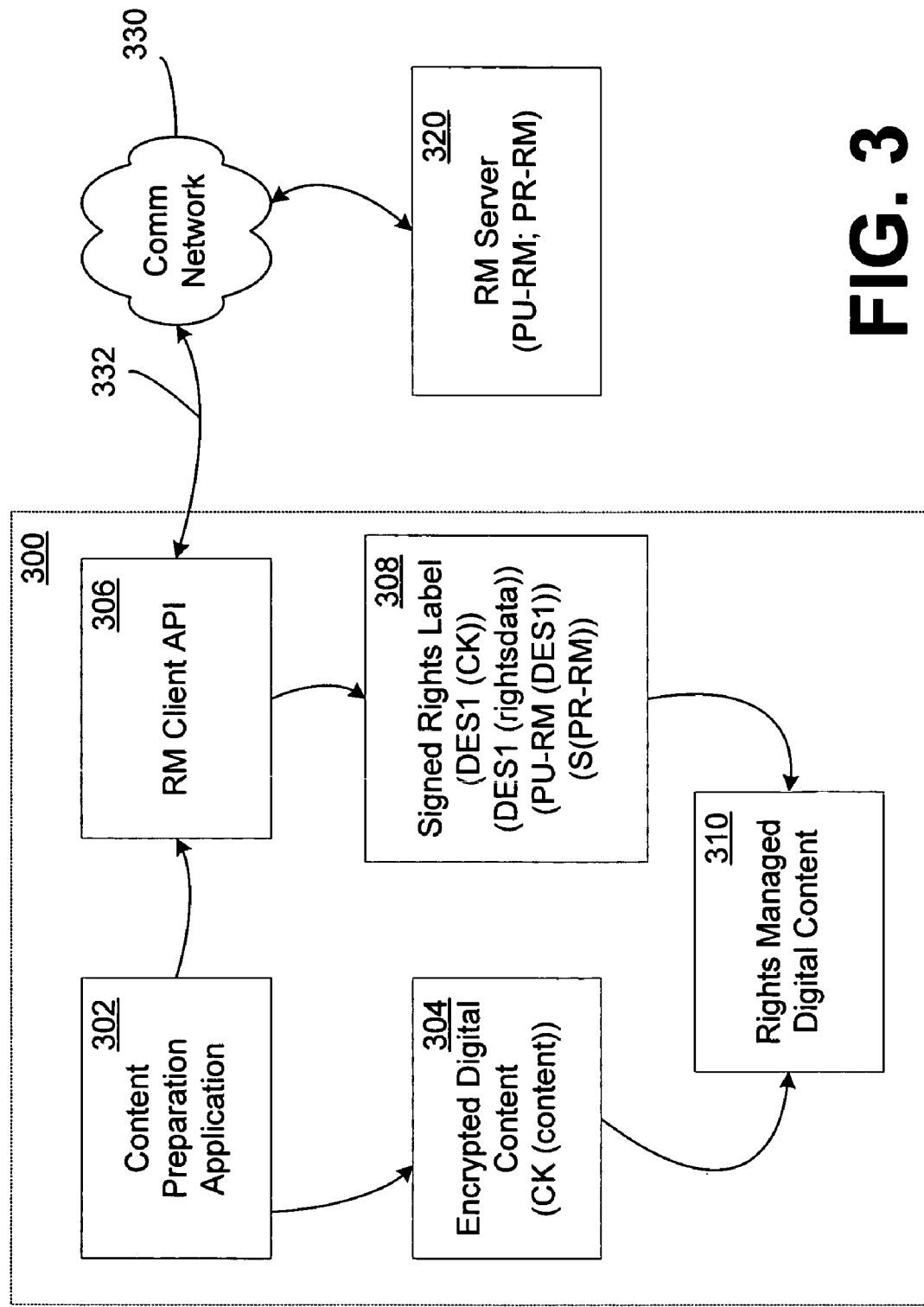
FIG. 3 is a functional block diagram of a preferred embodiment of a system and method according to the invention for publishing digital content.

FIG. 3 is a functional block diagram of a preferred embodiment of a system and method according to the invention for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

In a preferred embodiment of the invention, three entities in particular can be employed to publish secure digital content: a content preparation application 302 that executes on the client 300 and prepares the content for publishing, a rights management (RM) applications program interface (API) 306 that also resides on the client device 300, and a RM server 320 that is communicatively coupled to the client 300 via a communication network 330. In a preferred embodiment of the invention, the communication network 330 includes the Internet, though it should be understood that the communication network 330 could be any local or wide area network, such as a proprietary intranet, for example.

The content preparation application 302 can be any application that produces digital content. For example, the application 302 can be a word processor or other publisher that produces digital text files, digital music, video, or other such content. The content could also include streamed content, such as streamed audio/video of a live or taped event, or example. According to the invention, the content preparation application invites the user thereof to encrypt the content using a key that the user provides. The application 302 uses the key to encrypt the digital content, thus forming an encrypted digital content file 304. The client application also invites the user to provide rights data for the digital content file 304. The rights data includes a respective identity for each entity that has rights in the digital content. Such an entity can be, for example, an individual, a class of individuals, or a device. For each such entity, the rights data also includes a list of rights that that entity has in the content, and any conditions that may be imposed on any or all of those rights. Such rights can include the right to read, edit, copy, print, etc, the digital content. Additionally, rights can be inclusive or exclusive. Inclusive rights indicate that a specified user has a specified right in the content (e.g., the user can edit the digital content). Exclusive rights indicate that a specified user has all rights in the content except those specified (e.g., the user can do anything with the digital content except copy it).

According to one embodiment of the invention, the client API 306 can pass the encrypted digital content and the rights data to the RM server 320. Using a process that is described in detail below, the RM server 320 determines whether it can enforce the rights that the user has assigned and, if so, the RM server 320 signs the rights data to form a signed rights label (SRL) 308. In general, however, any trusted entity can sign the rights data, preferably using a key trusted by the RM server 320. For example, a client can sign the rights data using a key provided to it by the RM server 320.

The rights label 308 can include data representing the rights description, the encrypted content key, and the digital signature over the rights description and the encrypted content key. If the RM server is signing the right label, it passes the signed rights label 308 back to the client through the client API 306, which stores the signed rights label 308 on the client device 300. The content preparation application 302 then associates the signed rights label 308 with the encrypted digital content file 304. For example, the SRL 308 can be concatenated with the encrypted digital content file to form a rights managed content file 310. In general, however, the rights data need not be combined with the digital content. For example, the rights data could be stored in a known location, and a reference to the stored rights data could be combined with the encrypted digital content. The reference could include an identifier that indicates where the rights data is stored (e.g., the data store that contains the rights data), and an identifier that corresponds to that particular rights data at that particular storage location (e.g., that identifies the file that contains the particular rights data of interest). The rights managed content 310 can then be delivered to anyone anywhere, and only those entities that have rights to consume the content can consume the content, and only in accordance with the rights they were assigned.

FIG. 4 is a flowchart of an exemplary method 400 according to the invention for publishing rights managed digital content, wherein the rights label is signed by a RM server. It should be understood however, that this embodiment is merely exemplary, and that the rights label can be signed, in general, by any trusted entity. Generally, a method according to the invention for publishing digital content can include: encrypting the digital content using a content key (CK), generating a rights description associated with the digital content, encrypting the content key (CK) according to a public key for a RM server (PU-RM) to result in (PU-RM(CK)), and creating a digital signature based on a private key (PR-RM) corresponding to (PU-RM) over the combination of the rights description and (PU-RM(CK)).

At step 402, the application 302 generates a content key (CK) that is used to encrypt the digital content. Preferably, the content key (CK) is a symmetric key, though, in general, any key can be used to encrypt the digital content. Symmetric key algorithms, which are sometimes referred to as "secret key" algorithms, use the same key to decrypt a message as they do to encrypt the message. For that reason, it is preferred that (CK) be kept secret. Sharing (CK) between sender and receiver should be done very carefully to avoid unauthorized interception of such (CK). Because (CK) is shared between both the encryptor and the decryptor, (CK) is preferably communicated before any encrypted messages are transmitted.

Several symmetric key generation algorithms are well known in the art. In a preferred embodiment, the Data Encryption Standard (DES) is employed, though it should be understood that any symmetric algorithm could be used. Examples of such symmetric key algorithms include, without limitation, Triple-DES, the International Data Encryption Algorithm (IDEA), Cast, Cast-128, RC4, RC5, and SkipJack.

At step 404, the application 302 encrypts the digital content with the symmetric content key (CK) to form encrypted digital content 304, which may be written using the notation (CK(content)). The author using the application 302 can also generate rights data associated with the digital content. The rights data can include a list of entities that will be entitled to consume the content, and the specific rights that each of the entities possesses with respect to the content, along with any conditions that may be imposed on those rights. Such rights can for example include viewing the content, printing the content, etc. The application 302 provides the rights data to the API 306. An example of rights data in XML/XrML format is attached hereto as Appendix 1.

At step 406, the API 306 generates a second encryption key (DES1), which is used to encrypt the content key (CK). Preferably, (DES1) is also a symmetric key. At step 408, the API 306 encrypts (CK) with (DES1) to result in (DES1(CK)). At step 410, the API 306 discards (CK), with the result being that (CK) can now be obtained only by decrypting (DES1(CK)). To ensure that (CK(content)) is protected to a central RM server 320 and that all "license requests" for the content are done centrally in accordance with the rights data, the API 306, at step 412, contacts the provided RM server 320 and retrieves the public key (PU-RM) thereof. At step 414, the API 306 encrypts (DES1) with (PU-RM) to result in (PU-RM (DES1)). Thus, (CK) can be protected to (PU-RM)) to ensure that the RM server 320 is the only entity that will be able to get access to (CK), as is required to decrypt (CK(content)). At step 416, the API 306 encrypts the rights data (i.e., the list of authorized entities and the respective rights and conditions associated with each authorized entities in the list) with (DES1) to result in (DES1(rightsdata)).

In a simplified and perhaps preferable embodiment, (CK) can be used to directly encrypt the rights data to result in (CK(rightsdata)), and thereby forego the use of (DES1) completely. Of course, in such case, (PU-RM(DES1)) would instead be (PU-RM(CK)). However, using (DES1) to encrypt the rights data allows such (DES1) to conform to any particular algorithm that might be amenable to the RM server, whereas (CK) might be specified by an entity independent from the RM server and might not be as amenable thereto.

At step 418, the content protection application 302 can submit (PU-RM(DES1)) and (DES1(rightsdata)) or (CK (rightsdata)) to the RM server 320 as a rights label for signing. Alternatively, the client itself can sign the rights data. If the rights data is being submitted to the server for signing, then, at step 420, the RM server 320 accesses the rights data and verifies that it can enforce the rights and conditions in the submitted rights label. To verify that it can enforce the rights data, the RM server 320 applies (PR-RM) to (PU-RM (DES1)) to result in (DES1), and then applies (DES1) to (DES1(rightsdata)) to result in the rights data in the clear. The server 320 can then do any policy checks to verify that the users, rights, and conditions specified in the rights data are within any policy enforced by the server 320. The server 320 signs the originally submitted rights label including (PU-RM (DES1)) and (DES1(rightsdata)) to result in the signed rights label (SRL) 308, where the signature is based on the private key of the RM server 320 (PR-RM), and returns the SRL 308 back to the API 306, which then presents the returned SRL 308 to the client application 302.

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 4A, in one embodiment of the present invention, the SRL 308 may include information on the content that is the basis of the SRL 308, including perhaps an ID of the content; information on the RM server that signs the SRL 308, including (PU-RM(DES1)) and referral information such as a URL for locating the RM server on a network and fall-back information if the URL fails; information describing the SRL 308 itself; (DES1(rightsdata)); (DES1(CK)); and S (PR-RM), among other things. A sample SRL 308 in XML/XrML is attached hereto as Appendix 2.

By ensuring that a trusted entity signs the rights data to create a signed rights label 308, the RM server is asserting that it will issue licenses for the content in accordance with the terms set forth by the publisher as described in the rights data of the rights label 308. As should be appreciated, a user is required to obtain a license to render the content, especially inasmuch as the license contains the content key (CK). When a user wants to obtain a license for the encrypted content, the user can present a license request including the SRL 308 for the content and a certificate verifying the user's credentials to the RM server 320 or other license issuing entity. The license issuing entity can then decrypt (PU-RM(DES1)) and (DES1 (rightsdata)) to produce the rights data, list all the rights granted by the author (if any) to the license requesting entity, and construct a license with only those specific rights.

Preferably, upon the application 302 receiving the SRL 308, such application 302 concatenates the signed rights label 308 with the corresponding (CK(content)) 304 to form rights managed digital content. Alternatively, the rights data can be stored in a known location, with a reference to that location provided with the encrypted digital content. Thus, a rendering application that is RM-enabled can discover the signed rights label 308 via the piece of content the rendering application is attempting to render. This discovery triggers the rendering application to initiate a license request against the RM licensing server 320. Publishing application 302 can store a URL to the RM licensing server 320, for example, or the RM licensing server 320 can embed its own URL as a piece of metadata into the rights label before digitally signing it, so that the RM client API 306 called by the rendering application can identify the correct RM licensing server 320. Preferably, a unique identifier, such as a globally unique identifier (GUID), for example, is put into the rights label before it is signed.

In a preferred embodiment of the invention, simple object access protocol (SOAP) can be used for communication between the content protection application 302 or the rendering application and the RM server 320. Additionally, API libraries, such as API 306, can be provided so that applications, such as application 302, are not required to implement the client side of the RM protocol, but rather can just make local API calls. Preferably, XrML, an XML language, is used for describing rights descriptions, licenses, and rights labels for digital content, though it should be understood that any suitable format can be uses for the rights description and other data.

Obtaining a License for the Published Content

Figure 5:
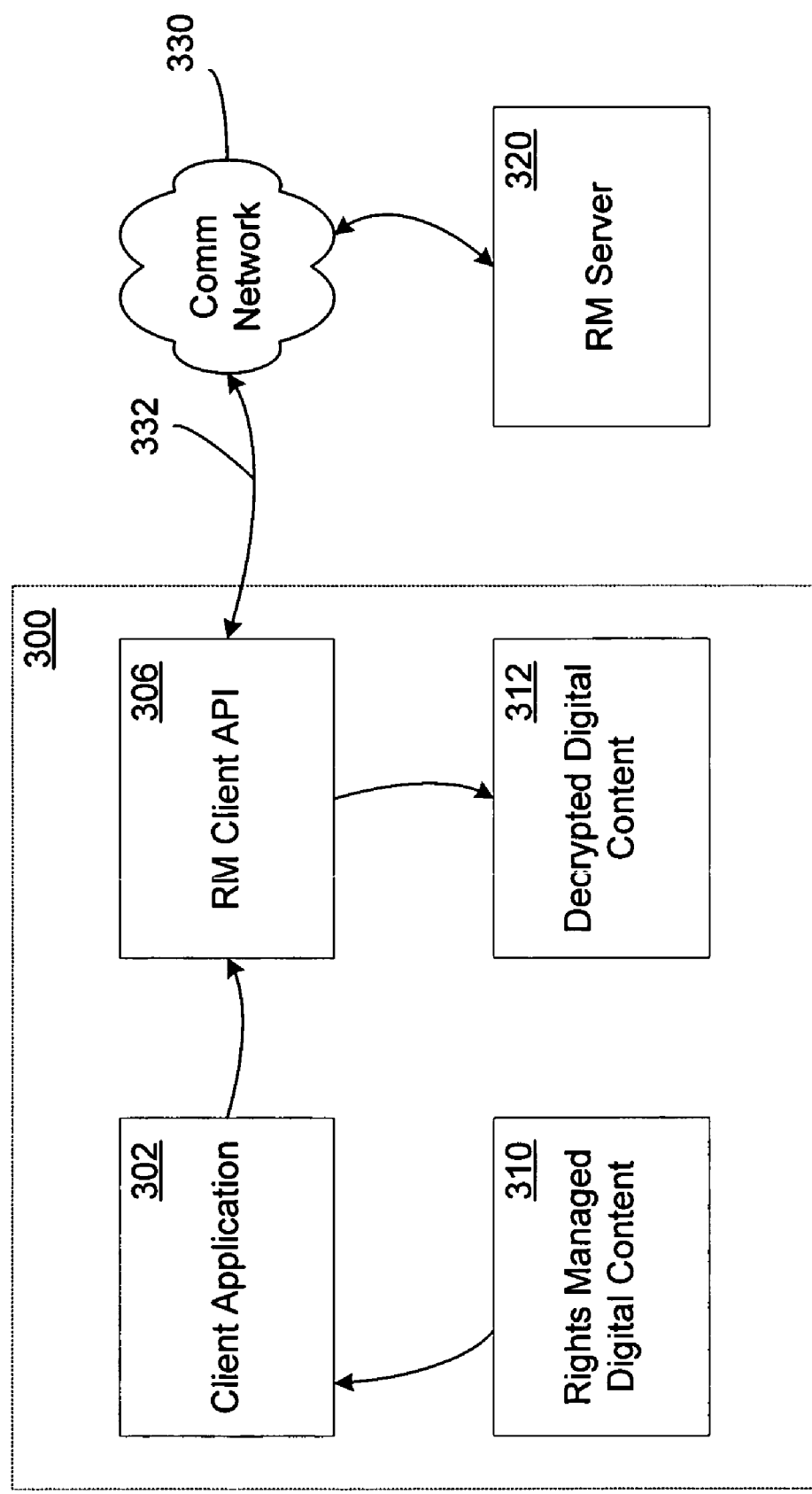
FIG. 5 is a functional block diagram of a preferred embodiment of a system and method according to the invention for licensing rights managed digital content.

FIG. 5 is a functional block diagram of a preferred embodiment of a system and method according to the invention for licensing rights managed digital content. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity(s) for which the license is being requested. Note that the entity requesting a license need not necessarily be the entity for which the license is being requested. Typically, a license includes the rights description from the SRL 308 an encrypted key that can decrypt the encrypted content, and a digital signature over the rights description and the encrypted key. The digital signature asserts that the entities and rights named are legitimate.

One way for the application 302 to consume the rights managed content 310 is for the client API 306 to forward the signed rights label 308 of the rights managed content 310 to the RM server 320 via the communication network 330. The location of the RM server 320 can be found, for example, in the referral information in the SRL 308. In such an embodiment, the RM licensing server 320, via a process that is described in detail below, can use the rights description in the rights label to determine whether it can issue a license and, if so, to derive the rights description to include with the license. As described above, the rights label 308 may contain the content key (CK) encrypted according to the public key of the RM server 320 (PU-RM) (i.e., (PU-RM(CK))). In the process of issuing a license, the RM server 320 securely decrypts this value to obtain (CK). It then uses the public key (PU-ENTITY) in the public key certificate that is passed up in the license request to re-encrypt (CK) (i.e., (PU-ENTITY(CK))). The newly encrypted (PU-ENTITY(CK)) is what the server 320 places into the license. Thus, the license can be returned to the caller without risk of exposing (CK), since only the holder of the associated private key (PR-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, a client, such as the publishing client, for example, can issue its own license to consume the content. In such an embodiment, a secured process can be run on the client computer that provides the client with the key(s) necessary to decrypt the digital content under appropriate circumstances.

Figure 6A:
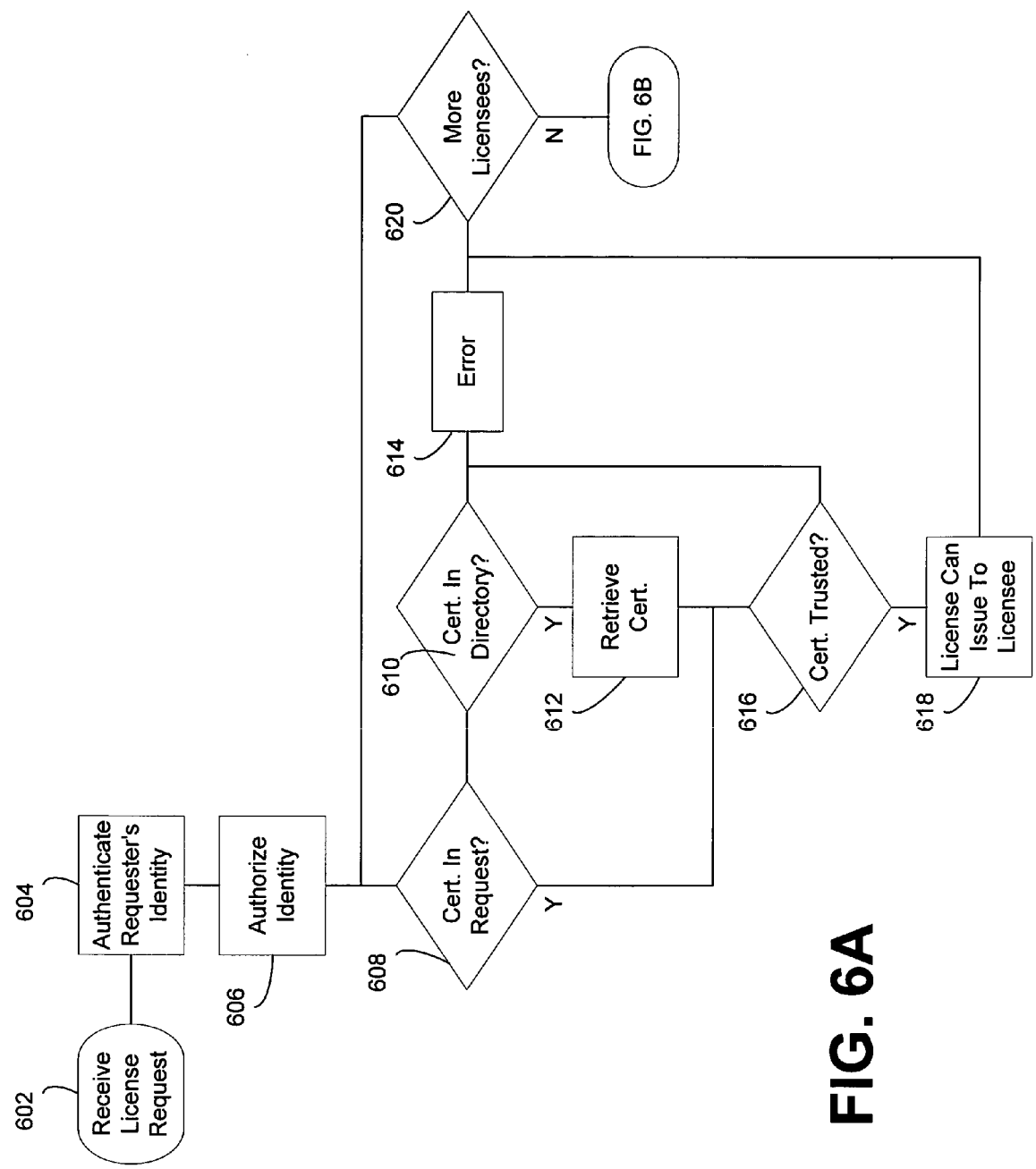
FIGS. 6A and 6B provide a flowchart of a preferred embodiment of a method according to the invention for licensing rights managed digital content.
Figure 6B:
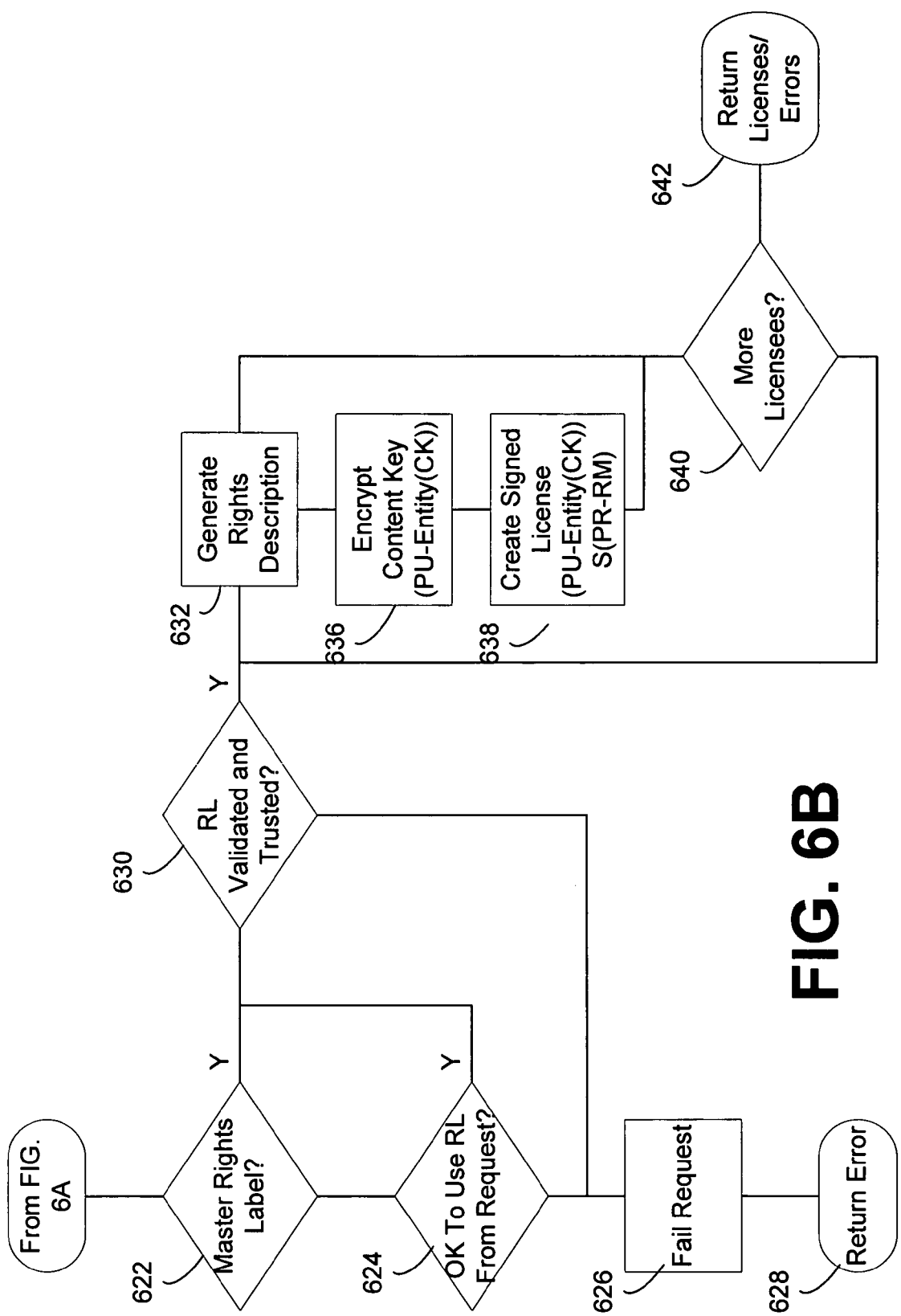

FIGS. 6A and 6B provide a flowchart of a preferred embodiment of a method 600 according to the invention for licensing rights managed digital content. According to the invention, a requesting entity can submit a license request on behalf of one or more potential licensee. The requesting entity may or may not be one of the potential licensees. A potential licensee can be a person, a group, a device, or any other such entity that can consume the content in any fashion. The method 600 will now be described with reference to an embodiment wherein a RM server processes the license request, though it should be understood that license request processing could also be performed on, and licenses issued directly by, the client.

At step 602, a license issuing entity, such as a RM server, for example, receives a license request. Preferably, a license request includes either a public key certificate or an identity for each of one or more requested licensees.

At step 604, the requesting entity (i.e., the entity making the license request) is authenticated. According to one embodiment of the invention, the license issuing entity can be configured to use protocol (e.g., challenge-response) authentication to determine the identity of the requesting entity, or it can be configured to not require authentication of the requesting entity (also known as "allowing anonymous authentication"). Where authentication is required, any type of authentication scheme may be used (e.g., the challenge-response scheme mentioned above, a user-id-and-password scheme such as MICROSOFT.NET, PASSPORT, WINDOWS authorization, x509, etc.). Preferably, anonymous authentication is allowed, as well as supporting any protocol authentication scheme supported by integrated information systems. The result of the authentication step will be an identity, such as an "anonymous" identity (for anonymous authentication), or a personal account identity, for example. If the license request cannot be authenticated for any reason, an error is returned and no license is granted.

At step 606, the authenticated entity is authorized—i.e., it is determined whether the entity authenticated at step 608 is allowed to request a license (either for itself or on behalf of another entity). Preferably, the license issuing entity stores a list of entities that are allowed (or not allowed) to request a license. In a preferred embodiment, an identity in this list of identities is the identity of the entity making the request, rather then the identity of the entity for whom a license is being requested, though it could be either. For example, a personal account identity may not be allowed to directly make a license request, but a trusted server process may make a license request on behalf of such an entity.

According to the invention, the license request can include either a public key certificate or an identity for each potential licensee. If a license is requested for only one licensee, only one certificate or identity is named. If a license is requested for a plurality of licensees, a certificate or an identity can be named for each potential licensee.

Preferably, the license issuing entity has a public key certificate for each valid licensee. However, an application 302 may want to generate a license for a given user, but the application 302 might not have access to the public key certificate for that user. In such a situation, the application 302 can specify the identity of the user in the license request and, as a result, the license issuing entity can invoke a registered certificate plug-in module that performs a lookup in a directory service and returns the appropriate user's public key certificate.

If, at step 608, the issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. In a preferred embodiment, a certificate plug-in is used to retrieve public key certificates from a directory service over by way of a directory access protocol. If a certificate cannot be found for a given potential licensee, either in the request or in the directory, then the license server does not generate a license for that potential licensee and, at step 614, an error is returned to the requesting entity.

Assuming the license issuing entity has a public key certificate for at least one potential licensee, then, at step 616, the issuing entity validates the trust of the licensee certificates. Preferably, the issuing entity is configured with a set of trusted certificate issuer certificates, and it determines whether the issuer of the licensee certificate is in the list of trusted issuers. If, at step 616, the issuing entity determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the issuing entity preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 6B, the license issuing entity proceeds to validate the signed rights label 308 that is received in the license request. In a preferred embodiment, the issuing entity can use a rights label plug-in, and a back-end database to store on the server a master copy of every rights label signed by the issuing entity. The rights labels are identified by the GUID placed into them at publication. At license time (at step 622), the issuing entity parses the rights label input in the license request and retrieves its GUID. It then passes this GUID to the rights label plug-in, which issues a query against the database to retrieve a copy of the master rights label. The master rights label could be more up to date than the copy of the rights label sent in the license request, and it will be the rights label used in the request in the steps below. If no rights label is found in the database based upon the GUID, the issuing entity checks its policy, at step 624, to determine whether it is still allowed to issue a license based on the rights label in the request. If the policy does not allow this, the license request will fail at step 626, and an error will be returned to the API 306 at step 628.

At step 630, the license issuing entity validates the rights label 308. The digital signature on the rights label is validated and, if the license issuing entity is not the issuer of the rights label (the entity that signed it), then the license issuing entity determines whether the issuer of the rights label is another trusted entity (e.g., an entity with which the license issuing entity is enabled to share key material). If the rights label does not validate, or it is not issued by a trusted entity, then the license request fails at step 626, and an error will be returned to the API 306 at step 628.

After all the validations have occurred, the license issuing entity translates the rights label 308 into a license for each of the approved licensees. At step 632, the license issuing entity generates a respective rights description for the license to be issued to each licensee. For each licensee, the issuing entity evaluates the identity named in the public key certificate of that licensee against the identities named in the rights description in the rights label. The rights description assigns to every right or set of rights, a set of identities that can exercise that right or set of rights in a license. For every right or set of rights to which this licensee's identity is associated, that right or set of rights is copied into a new data structure for the license. The resulting data structure is the rights description in the license for the particular licensee. As part of this process, the license issuing entity evaluates any preconditions that might be associated with any of the rights or sets of rights in the rights description of the rights label. For example, a right may have a time precondition associated with it that limits the license issuing entity from issuing a license after a specified time. In this case the issuing entity would need to check the current time and, if it is past the time specified in the precondition, then the issuing entity would not be able to issue that right to the licensee even if that licensee's identity were associated with that right.

At step 636, the issuing entity takes (PU-RM(DES1)) and (DES1(CK)) from the rights label 308 and applies (PR-RM) to obtain (CK). The issuing entity then re-encrypts (CK) using (PU-ENTITY) the licensee's public key certificate to result in (PU-ENTITY(CK)). At step 638, the issuing entity concatenates the generated rights description with (PU-ENTITY(CK)) and digitally signs the resulting data structure using (PR-RM). This signed data structure is the license for this particular licensee.

When, at step 640, the issuing entity determines that there are no more licenses to generate for the particular request, it will have generated zero or more licenses. The generated licenses are returned to the requesting entity, at step 642, along with the certificate chain associated with those licenses (e.g., the server's own public key certificate as well as the certificate that issued its certificate and so on).

In one embodiment of a system according to the invention, a plurality of licensor keys can be used. In such an embodiment, the content key (CK) that travels encrypted through the rights label 308 and into the license can actually be any arbitrary data. One particularly useful variation is to use a plurality of separate, encrypted, content keys (CK) associated, respectively, with different rights or different principals in the rights description. For example, the digital version of songs on an album could all be encrypted with different keys (CK). These keys (CK) would be included in the same rights label, but one principal may have the right to play one of the songs (e.g., he might only have rights to get the one key in his license), while a second principal might have rights to play all the songs (she would have rights to get all keys in her license).

Preferably, a system according to the invention enables publishing applications/users to name groups or classes of licensees in a rights label 308. In such an embodiment, the license issuing entity will evaluate any groups/classes named in the rights label to determine if the current licensee identity is a member of those groups classes. If membership in a named group/class is found, the issuing entity could add the rights or set of rights associated with the group/class to the rights description data structure used for the license.

In a preferred embodiment of the invention, the publish and license protocol interfaces in the RM server support authentication and authorization of the calling application or user, and the administrative console for the RM server allows an administrator to generate an access control list for both the licensing and publishing interfaces. This enables the customer of the server to apply policy over which users/applications are allowed to either publish, license, or both.

Self-Publishing the Signed Rights Label 308

In one embodiment of the present invention, the SRL 308 may be signed by the requesting user itself. Accordingly, the user need not contact the RM server 320 to obtain an SRL 308 for an associated piece of content. As a result, self-publishing may also be referred to as off-line publishing. In such embodiment, a user may be required to contact a RM server 320 to request a license based on such a self-published SRL 308. It should also be understood that a publishing entity may be enabled to issue its own licenses.

Figure 8:
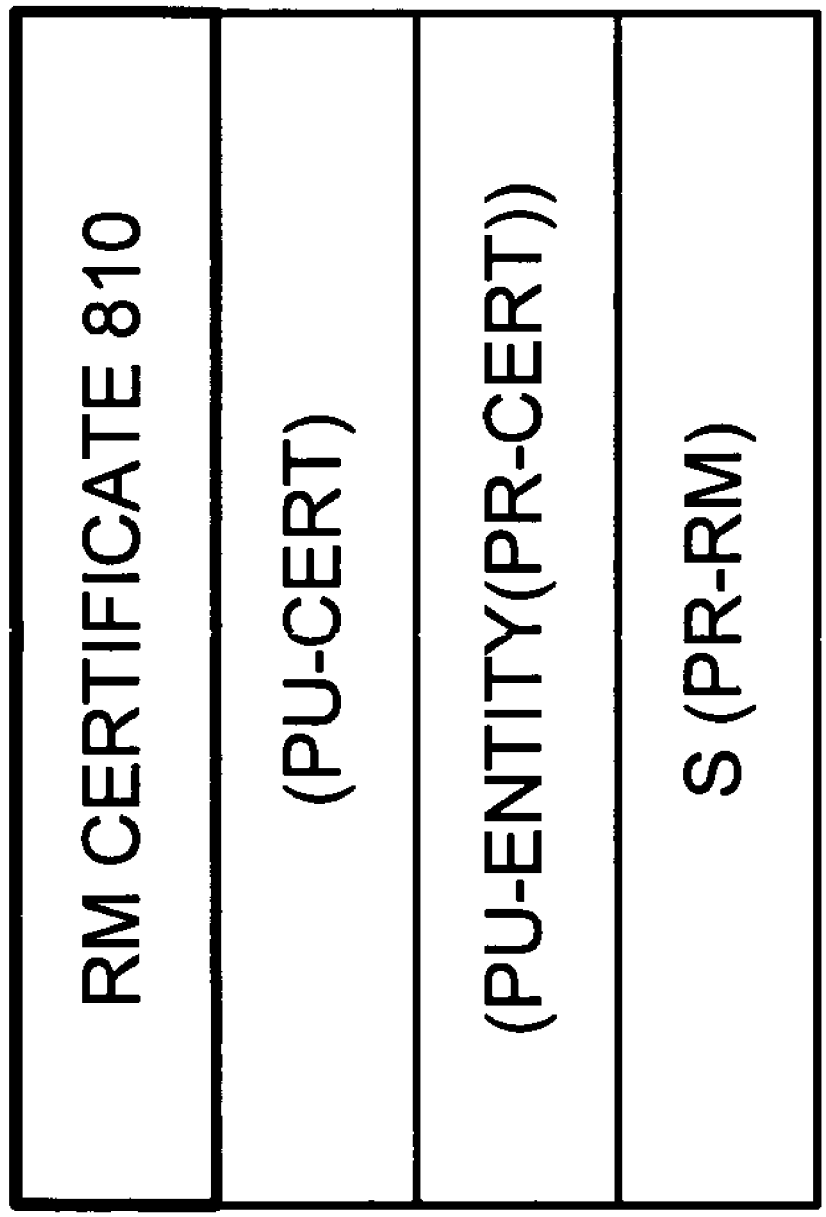
FIG. 8 is a block diagram showing a certificate issued by a RM server to a user to allow the user to perform off-line publishing in accordance with one embodiment of the present invention.

In particular, and referring now to FIG. 8, in the embodiment, a user is first provisioned to self-publish by receiving from a RM server 320 a RM certificate 810 including a public key (PU-CERT) and a corresponding private key (PR-CERT) encrypted according to the public key of the user (PU-ENTITY) to result in (PU-ENTITY(PR-CERT)). The certificate should be signed by the private key of the RM server 320 (PR-RM) so that such RM server 320 can verify same, as will be discussed in more detail below. As may be appreciated, the RM certificate 810 authorizes the user to self-publish. As may also be appreciated, the key pair (PU-CERT, PR-CERT) are separate from (PU-ENTITY, PR-ENTITY), and are employed specifically for self-publishing. Note that the key pair (PU-CERT, PR-CERT) may be dispensed with, in which case the RM certificate 810 includes only the public key of the user (PU-ENTITY) and is signed by the private key of the RM server 320 (PR-RM) so that such RM server 320 can verify same.

Self-publishing differs from publishing as shown in FIG. 4 in that the user essentially takes the place of the RM server 320 with regard to steps performed thereby. Significantly, the user signs the submitted rights label including (PU-RM (DES1)) and (DES1(rightsdata)) with (PR-CERT) as obtained from the RM certificate 810 (i.e., S (PR-CERT)) to result in the signed rights label (SRL) 308. As should be appreciated, the user obtains (PR-CERT) from the RM certificate 810 by obtaining (PU-ENTITY(PR-CERT)) from such RM certificate 810 and applying (PR-ENTITY) thereto. Note, though, that the user cannot verify that the RM server 320 can enforce the rights in the submitted rights label, especially inasmuch as the user does not have (PR-RM) to apply to (PU-RM(DES1)). Accordingly, the RM server 320 itself should perform the verification at the time a license is requested based on the self-published SRL 308.

Once the user self-publishes the SRL 308, the user concatenates such self-published SRL 308 and the RM certificate 810 employed to produce same to the content, and such content with SRL 308 and RM certificate 810 is distributed to another user. Thereafter, the other user requests and obtains a license for the content from the RM server 320 in substantially the same manner as shown in FIGS. 6A and 6B. Here, though, the license-requesting user submits to the RM server 320 both the self-published SRL 308 and the RM certificate 810 as concatenated to the content. The RM server 320 then verifies S (PR-RM) in the RM certificate 810 based on the corresponding (PU-RM), and obtains (PU-CERT) from the RM certificate 810. The RM server 320 then verifies S (PR-CERT) in the SRL 308 based on the obtained (PU-CERT), and continues as before. Note, though, that since the user did not verify that the RM server 320 can enforce the rights in the SRL 308, and as was set forth above, the RM server 320 itself should perform the verification at this time.

Rights Template

As set forth above, a user is provided with the freedom to create most any variety or sort of rights data in a rights label by defining users or classes of users, defining rights for each defined user or class of users, and then defining any use conditions. However, and significantly, it may be cumbersome and repetitive to repeatedly define the rights data for multiple rights labels, especially when the same users or classes of users, rights, and conditions are repeatedly defined for different pieces of content. Such a situation can for example occur in a corporate or office environment, where a user is repeatedly publishing different pieces of content that are to be shared with a particular defined team of users. In such a situation, then, and in one embodiment of the present invention, a rights template is created that the user can repeatedly employ in connection with creating rights labels, where the rights template already includes therein a pre-defined set of users or classes of users, pre-defined rights for each defined user or class of users, and pre-defined use conditions.

In one embodiment of the present invention, and turning now to FIG. 9, a rights template 900 has substantially the same rights data as would be in a rights label. However, since (DES1) and/or (CK) are not known until content is published, the rights data cannot be encrypted according to such (DES1) or (CK), as is the case in a rights label. In one embodiment of the present invention, then, the rights template 900 with the unencrypted rights data is submitted in the course of encrypting the rights data with (DES1) at step 416 of FIG. 4 or with (CK) to produce (DES1(rightsdata)) or (CK(rightsdata)). Of course, the rights data is retrieved from the submitted rights template 900 prior to being so encrypted.

It may or may not be the case that the RM server 320 and the public key (PU-RM) thereof are known at the time the rights template is constructed. Further, even if known, it may or may not be the case that there are more than one RM servers 320, each having its own (PU-RM). Nevertheless, in the case where the RM server 320 and the public key (PU-RM) thereof are known at the time the rights template is constructed, and in the case where only one RM server 320 is employed, or only one RM server 320 is to be employed in connection with the rights template 900, such rights template may also include therein information on the RM server that is to sign a rights label resulting from the rights template 900, including the public key (PU-RM) thereof. Although such (PU-RM) appears in the SRL 308 as encrypting (DES1) or (CK) to result in (PU-RM(DES1)) or (PU-RM(CK)), it is again to be appreciated that (DES1) and/or (CK) are not known until content is published, and therefore (PU-RM) in the rights template 900 cannot encrypt such (DES1) or (CK), as is the case in a rights label. In one embodiment of the present invention, then, the rights template 900 with the unencrypted (PU-RM) is submitted in the course of encrypting (DES1) with (PU-RM) at step 414 of FIG. 4 to produce (PU-RM (DES1)) or in the course of producing (PU-RM(CK)). Of course, (PU-RM) is retrieved from the submitted rights template 900 prior to being employed.

Also in the aforementioned case, other information on the RM server that may be included in the rights template may also include referral information such as a URL for locating the RM server on a network, and fall-back information if the URL fails. In any case, the rights template may also include information describing the rights template 900 itself, among other things. Note that the rights template 900 may also provide space for information relevant to the content that is to be published, such as information that appears in a rights label relevant to the content and/or the encrypting keys (CK) and (DES1), although such space is not necessary if an instantiation of the rights template is not actually transformed into a right label.

Although the rights template 900 as thus far disclosed is primarily for the convenience of a user, it is also to be appreciated that in some circumstances, a user should not have unrestricted freedom to define rights data in a rights label, and a rights template 900 may be used to limit the scope or type of rights labels that can be created. For example, and especially in the case of a corporate or office environment, it may be pre-defined as policy that a particular user should always publish content to a particular class of users only, or that the user should never publish content to a particular class of user. In any case, and in one embodiment of the present invention, such policy is embodied as pre-defined rights data in one or more rights templates 900, and the user may be restricted to employing such rights templates to create rights labels when publishing content. Notably, a rights template or a group of rights templates made available to a user to specify publishing policy for the user may specify any particular type of publishing policy without departing from the spirit and scope of the present invention.

Figure 10:
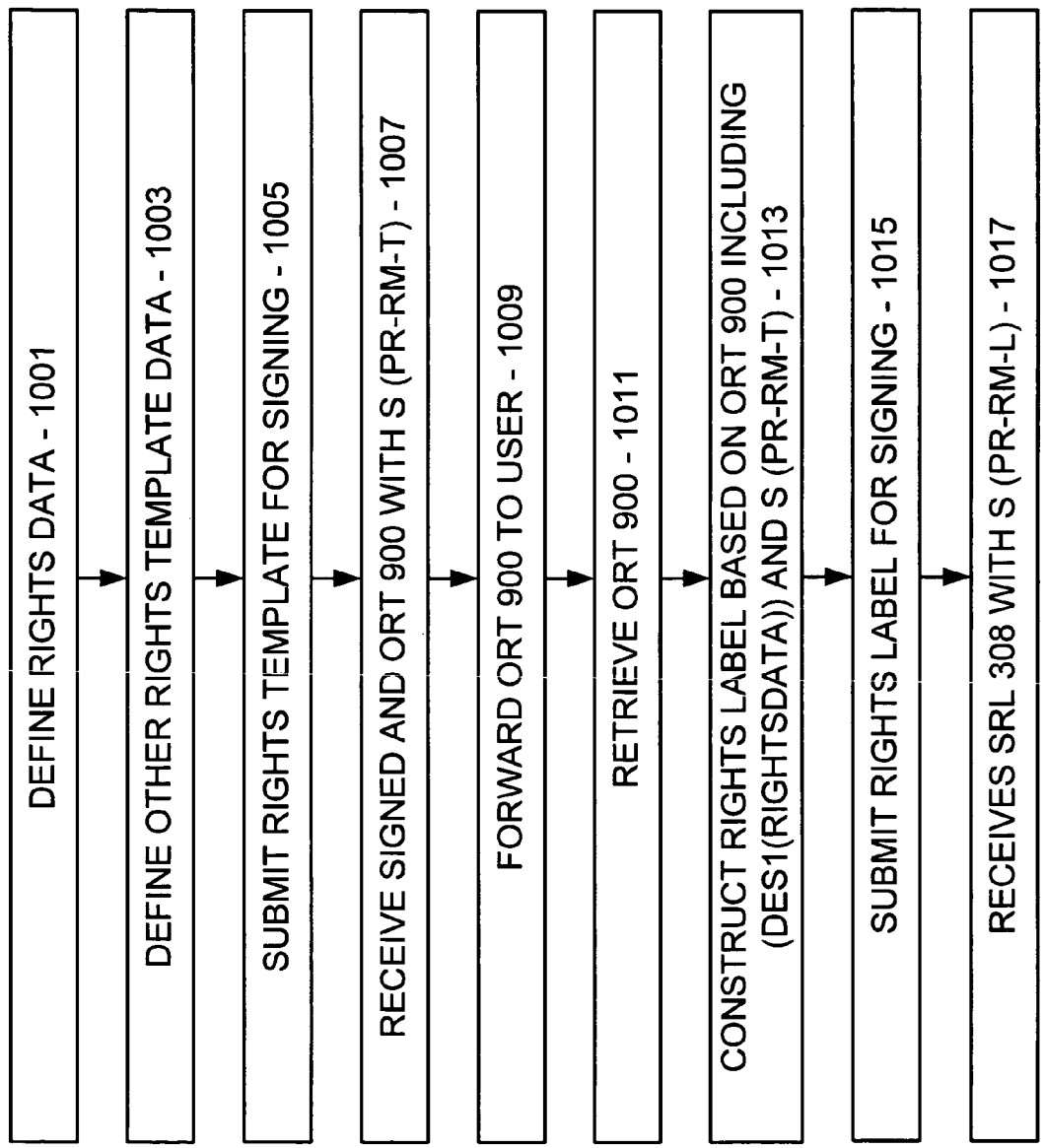
FIG. 10 is a flow chart showing key steps performed in creating the rights template of FIG. 9 and creating the signed rights label of FIG. 4A based on the rights template in accordance with one embodiment of the present invention.

To specify a rights template 900 for a restricted user or the like, and turning now to FIG. 10, an administrator or the like in fact constructs the rights template 900 by defining the pre-defined rights data (step 1001), and defining any other data that may be necessary and appropriate, such as information relevant to a particular RM server 320 (step 1003). Significantly, to effectuate the rights template for use by the restricted user or the like, the rights template 900 must be made official. That is, the rights template 900 must be recognizable as a rights template that the restricted user or the like may employ. Accordingly, in one embodiment of the present invention, the rights template as constructed by the administrator or the like is submitted to the RM server 320 for signing thereby, where such signing makes the rights template official (step 1005).

Note that the signing RM server 320 is the RM server 320 whose information is in the rights template 900, if indeed such information is in fact present in the rights template 900. Note, also, that the RM server 320 may sign the rights template 900 only upon making any necessary checks, or may sign without any checks at all. Note, finally, that the template signature S (PR-RM-T) (where the -T signifies that the signature is for the ORT 900) from the RM server should be based at least on the pre-defined rights data in the rights template 900, but may also be based on other information without departing from the spirit and scope of the present invention. As set forth below, the signature S (PR-RM-T) will be incorporated into a rights label and will be verified in connection therewith, and accordingly whatever the signature is based on should also be incorporated into the rights label in an unaltered form.

Upon the RM server 320 signing the rights template 900 and returning same to the administrator or the like, the administrator receives the signed and now official rights template 900 with S (PR-RM-T) (step 1007) and forwards the official rights template (ORT) 900 to one or more users for use thereby (step 1009). Accordingly, for a user to publish content based on an ORT 900, the user retrieves the ORT 900 (step 1011), and constructs a rights label based on the ORT 900 (step 1013) by providing any information necessary, such as information on the content, appropriate key information, the rights data from the ORT 900 encrypted by (DES 1) or (CK) to result in (DES 1 (rightsdata)) or (CK(rightsdata)), and any other information from the ORT 900. Significantly, the user also includes with the rights label the signature S (PR-RM-T) from the ORT 900.

Thereafter, and as before, the user submits the rights label to the RM server 320 for signing (step 1015). Here, though, the RM server 320 will not sign the submitted rights label unless S (PR-RM-T) therein verifies. That is, the RM server 320 enforces that the user must base the submitted rights label on an ORT 900 by refusing to sign the submitted rights label unless such submitted rights label includes a signature S (PR-RM-T) from an ORT 900. In particular, the RM server 320 retrieves such S (PR-RM-T) and whatever information such signature is based on from the submitted rights label and then verifies such signature based on (PU-RM). Note that the rights data in the submitted rights label is encrypted according to (DES1) (i.e., (DES1(rightsdata)) or (CK) (i.e., (CK (rightsdata)) Accordingly the RM server 320 must first decrypt the encrypted rights data as was set forth above in connection with FIG. 7 to be able to verify the signature based on the rights data in the submitted rights label.

Once verified, the RM server 320 signs the submitted rights label with S (PR-RM-L) to produce an SRL 308, as before (where the -L signifies that the signature is for the SRL 308). Here, S (PR-RM-L) may replace S (PR-RM-T), or may be in addition to such S (PR-RM-T). If in addition, S (PR-RM-L) may be based in part on S (PR-RM-T). Note that (PR-RM) may be employed to produce both S (PR-RM-T) and S (PR-RM-L), or that different (PR-RM)s may be employed for each of S (PR-RM-T) and S (PR-RM-L). Upon the RM server 320 signing the rights label and returning the SRL 308 to the user, the user receives the SRL 308 with S (PR-RM-L) (step 1017) and proceeds to concatenate same to the content being published, as before.

Flexible Rights Template

If the signature S (PR-RM-T) of the ORT 900 is based at least in part on the pre-defined rights data in the ORT 900, then such rights data as it appears in the SRL 308 cannot be modified or varied. Otherwise, S (PR-RM-T) as it may appear in the SRL 308 will not verify. Nevertheless, in one embodiment of the present invention, the rights data in the ORT 900 can vary within prescribed rules that are also included with the ORT 900. For example, the rules may specify one of two sets of rights data to be included in an SRL 308, or may allow a selection from among a set of alternatives. As may be appreciated, the rules may be any particular rules set forth in any appropriate syntax without departing from the spirit and scope of the present invention. Here, the rules are interpreted by an appropriate rule interpreter for the user at the time the rights label is created. Although the rights data may vary, the rules do not likewise vary, and accordingly the template signature S (PR-RM-T) for the ORT 900 may be based at least in part on the rules and not on the rights data itself. If so, the rules included with the ORT 900 must also be included with the SRL 308.

In one embodiment of the present invention, the pre-defined rights data in the ORT 900 is fixed and invariant in part and is variable, flexible, and rule-driven in part, as set forth above. Here, the template signature S (PR-RM-T) for the ORT 900 is based at least in part on at least one of the fixed part of the rights data and on the rules for the flexible part of the rights data.

Flexibilty in a rights template such as the ORT 900 may be exhibited in any of several manners, as will be set forth below.

As set forth above and as seen in connection with FIG. 4A, an ORT 900 can specify each of one or more particular users or groups of users and rights therefor, where such users can thus obtain licenses 16 based on such SRL 308. However, such ORT 900 in particular does not allow a publisher in publishing an SRL 308 based on such ORT 900 any options regarding specifying such users, such rights, any related conditions, and the like. Put another way, the ORT 900 as thus far disclosed does not allow the publisher any flexibility in defining such users that can obtain a license 16 based on the ORT 900, the rights of such users that are to be specified in the license 16, the conditions that are to be specified in the license 16 and that such users must satisfy to employ such rights, etc.

Accordingly, in one embodiment of the present invention, the ORT 900 is made flexible by specifying therein any required subset of users, any required subset of license rights for each user, and any required subset of conditions for right, as well as corresponding rules that are to be employed when a publisher selects such users, rights, and conditions in the course of publishing based on the ORT 900. Pseudo-code representing such users, rights, and conditions together with the rules therefore may appear as:

```
<RIGHTS TEMPLATE>
    ...
    <USERS, RIGHTS, CONDITIONS>
        <USERS>
            <DEFINITION OF ALLOWABLE USERS>
                ...
            </DEFINITION OF ALLOWABLE USERS>
            <RULES>
                ...
            </RULES>
        </USERS>
        <RIGHTS>
            <DEFINITION OF ALLOWABLE RIGHTS>
                ...
            </DEFINITION OF ALLOWABLE RIGHTS>
            <RULES>
                ...
            </RULES>
        </RIGHTS>
        <CONDITIONS>
            <DEFINITION OF ALLOWABLE CONDITIONS>
                ...
            </DEFINITION OF ALLOWABLE CONDITIONS>
            <RULES>
                ...
            </RULES>
        </CONDITIONS>
    </USERS, RIGHTS, CONDITIONS>
    ...
</RIGHTS TEMPLATE>
```

For example, with regard to users, an ORT 900 may allow a publisher to specify any user within an organization, or only users within an organization that are within a predefined group, or only specified individual users, or a combination thereof. Likewise, an ORT 900 may allow a publisher to specify any user or group of users, but also requires the publisher to specify a particular administrative user as a 'last man' user that can obtain a license 16 in the event that no other user in the organization can so obtain such license 16.

With regard to rights and conditions, an ORT 900 may allow a publisher to grant all rights to a particular user or group of users, or may restrict a particular user or group of users to particular rights, or may restrict one user to particular rights as long as another user can obtain all rights, or a combination thereof. Likewise, an ORT 900 may require a publisher to grant all rights to a particular user or group of users, such as for example the aforementioned last man user. Similarly, an ORT 900 may require that a right for a first type of user be conditioned in a first manner and that the same right for a second type of user be conditioned in a second manner. As should be appreciated, then, the manner of specifying users, rights, conditions, and the like in an ORT 900 may be any appropriate manner without departing from the spirit and scope of the present invention.

As set forth above and as seen in connection with FIGS. 4A and 9, an ORT 900 and an SRL 308 derived therefrom can specify each of one or more particular users or groups of users and rights therefor, where such users can thus obtain licenses 16 based on such SRL 308. However, such ORT 900 in particular does not likewise specify each of one or more users or groups of users, where such users can employ the ORT 900 to publish. Put another way, the ORT 900 as thus far disclosed does not allow any selectivity regarding users that can use such ORT 900 to publish.

Accordingly, in one embodiment of the present invention, the ORT 900 is made flexible by specifying therein each of one or more users or groups of users that can employ the ORT 900 to publish, and perhaps corresponding rules setting forth how to ensure that a publisher wishing to employ the ORT 900 to publish is in fact a publisher specified within in the ORT 900 and is therefore in fact allowed by the ORT 900 to publish based on such ORT 900. Pseudo-code representing such users who are allowed to publish may appear as:

```
<RIGHTS TEMPLATE>
    ...
    <USERS ALLOWED TO PUBLISH >
        <DEFINITION OF ALLOWED USERS>
            ...
        </DEFINITION OF ALLOWED USERS>
        <RULES>
            ...
        </RULES>
    </USERS ALLOWED TO PUBLISH >
    ...
</RIGHTS TEMPLATE>
```

Thus, and as an example, a finance department in a corporation may have a particular finance ORT 900 created therefor, where the particular finance ORT 900 specifies therein that all members of such finance department and all members of an accounting department of the corporation may use such finance ORT 900. Likewise, a legal department in the corporation may have a particular legal ORT 900 created therefor, where the particular legal ORT 900 specifies therein that all members of such legal department who are attorneys may use such legal ORT 900.

Note here that the corresponding rules may simply require that a potential publisher be specifically listed in the ORT 900 or that the potential publisher be a member of a group specifically listed in the ORT 900. Alternatively, the corresponding rules may require that the potential publisher be specifically listed in the ORT 900 and that the potential publisher be a member of a group specifically listed in the ORT 900, or that the potential publisher satisfy another more complex requirement. As should be appreciated, then, the corresponding rule may be any appropriate rule without departing from the spirit and scope of the present invention.

As set forth above and as seen in connection with FIG. 4A, an SRL 308 includes the public key of the RM server 320 encrypting either (DES1) or (CK) to produce either (PU-RM (DES1)) or (PU-RM(CK)), whereby only such RM server 320 can access (DES1) or (CK) in the course of issuing a license to a requesting user. Correspondingly, the ORT 900 as seen in connection with FIG. 9 includes such (PU-RM), and thus use of such ORT 900 results in an SRL 308 tied specifically to the RM server 320 and also results in a license 16 tied specifically to such RM server 320.

Accordingly, in one embodiment of the present invention, the ORT 900 is made flexible by including therein the public key (PUx-RM) of each of several different RM servers 320, as well as corresponding rules specifying how to select one or more of such different RM servers 320 by way of their corresponding (PUx-RM)s when constructing a rights label based on such ORT 900. Pseudo-code representing such RM servers 320 allowed to license together with the rules therefore may appear as:

```
<RIGHTS TEMPLATE>
    ...
    <LICENSING SERVERS>
        <SERVER 1>
```

```
            <NAME>
              . . .
            </NAME>
            <ADDRESS >
              . . .
            </ADDRESS>
            <PUBLIC KEY>
              . . .
            </PUBLIC KEY>
          </SERVER 1>
          <SERVER 2>
            <NAME>
              . . .
            </NAME>
            <ADDRESS >
              . . .
            </ADDRESS>
            <PUBLIC KEY>
              . . .
            </PUBLIC KEY>
          </SERVER 2>
          . . .
          <RULES>
            . . .
          </RULES>
        </LICENSING SERVERS >
        . . .
      </RIGHTS TEMPLATE>
```

For example, the ORT 900 may specify public keys (PU1-RM), (PU2-RM), and (PU3-RM), respectively corresponding to first, second, and third RM servers 320, and a rule specifying that a rights label derived from such ORT 900 can include any or all of such first, second, and third RM servers 320. Note here that such first, second, and third RM servers 320 can be RM servers 320 within the organization of the publisher and/or outside the organization of the publisher. In the latter case, users outside of the organization of the publisher can be provided with access to content 12 published by such publisher if such users have rights to get licenses 16 from any of the specified RM servers 320.

As should now be appreciated, then, a publisher in selecting each particular (PUx-RM) from an ORT 900 to appear in an SRL 308 in effect places such (PUx-RM) in the SRL 308 as encrypting either (CK) or (DES1) (hereinafter, '(CK)' or the equivalent). As an example, if the publisher selects (PU1-RM) and (PU3-RM) from the ORT 900, the resulting SRL 308 would include both (PU1-RM(CK)) and (PU3-RM (CK)). As a result, a user is allowed to obtain a license 16 from either the first or the third RM server 320, presuming such user otherwise has rights to so obtain such license 16 from such RM server 320.

In a similar manner, the ORT 900 as set forth above and as seen in connection with FIG. 9 does not specify a particular RM server 320 that can provide an SRL 308 based on such ORT 900 in the course of publishing. Accordingly, in one embodiment of the present invention, the ORT 900 is made flexible by including therein the public key (PUx-RM) of each of one or more specific RM servers 320 that can be employed to so publish, as well as corresponding rules specifying how to select from among the RM servers 320 by way of their corresponding (PUx-RM)s when constructing a rights label based on such ORT 900. Similar to that above, pseudo-code representing such RM servers 320 allowed to publish together with the rules therefore may appear as:

```
      <RIGHTS TEMPLATE>
        . . .
        <PUBLISHING SERVERS>
          <SERVER 1>
            <NAME>
              . . .
            </NAME>
            <ADDRESS >
              . . .
            </ADDRESS>
            <PUBLIC KEY>
              . . .
            </PUBLIC KEY>
          </SERVER 1>
          <SERVER 2>
            <NAME>
              . . .
            </NAME>
            <ADDRESS >
              . . .
            </ADDRESS>
            <PUBLIC KEY>
              . . .
            </PUBLIC KEY>
          </SERVER 2>
          . . .
          <RULES>
            . . .
          </RULES>
        </PUBLISHING SERVERS >
        . . .
      </RIGHTS TEMPLATE>
```

For example, the ORT 900 may specify the aforementioned public keys (PU1-RM), (PU2-RM), and (PU3-RM), respectively corresponding to the aforementioned first, second, and third RM servers 320, and a rule specifying that a rights label is to be derived from such ORT 900 by only such first, second, or third RM servers 320. Alternatively, the rule may specify that the first RM server is to be employed unless unavailable, in which case wither the second or third RM server 320 is to be employed. As before, such first, second, and third RM servers 320 can be RM servers 320 within the organization of the publisher and/or outside the organization of the publisher.

The list of RM servers 320 in an ORT 900 that can be employed to publish based on such ORT 900 need not necessarily appear in an SRL 308 derived from such ORT 900, especially inasmuch as such a list likely has no use in such SRL 308. However, such list may nevertheless appear in such SRL 308 without departing from the spirit and scope of the present invention.

Note that the ORT 900 as thus far disclosed includes information set forth directly therein, whereby the only way to change such information is to change the ORT 900. However, it is to be appreciated that it may be necessary to change such information in a more expeditious manner. For example, if a certain user should no longer be specifically listed in one or more ORTs 900 of an organization, it may be cumbersome to edit each such ORT 900 to remove the user therefrom, especially if the organization is rather large and the user could be listed in hundreds or even thousands of such ORTs 900 of such organization. Likewise, if a certain RM server 320 is to be added as an issuer of licenses 16 in one or more ORTs 900 of the organization, it again may be cumbersome to edit each such ORT 900 to add the RM server 320 thereto.

Accordingly, in one embodiment of the present invention, particular pieces of information such as those that are susceptible to change need not appear directly in an ORT 900, but instead can be represented within the ORT 900 as a reference to a location from which such information may be obtained. Such reference may for example be a pointer or the like. Pseudo-code including such a reference may appear as:

```
<RIGHTS TEMPLATE>
    ...
    <LICENSING SERVERS>
        <SERVER 1>
            [REFERENCE TO SERVER 1 INFORMATION]]
        </SERVER 1>
        <SERVER 2>
            [REFERENCE TO SERVER 2 INFORMATION]]
        </SERVER 2>
        ...
    </LICENSING SERVERS >
    ...
</RIGHTS TEMPLATE>
```

Of course, such information as obtained by way of such a reference should appear directly in an SRL 308 derived from the ORT 900, as necessary. It should be appreciated that the location from which such information may be obtained should be a secure location not easily susceptible to a nefarious entity who may wish to attempt to change such information within such location.

As may be appreciated, the information referenced to within the ORT 900 may be any appropriate information without departing from the spirit and scope of the present invention. For example, such information referenced may include a public key for a particular RM server 320 that a publisher can use to publish, a list of public keys for all RM server 320 that a publisher can use to publish, a particular user that is to be the aforementioned last man user in an ORT 900 and SRL 308 derived therefrom, a list of all users in the ORT 900 and SRL 308 derived therefrom, a list of rights for a particular users, a list of conditions for a particular right, etc.

In another embodiment of the present invention, particular pieces of information such as those that are susceptible to change can appear in an ORT 900 by way of wildcards, variables, or the like. Thus, and as an example, rather than specifying each user at company ABC individually, an ORT 900 may simply specify all such users by way of a term such as '*@ABC', where the '*' is a wildcard for every user and '@ABC' represent the company ABC. Pseudo-code including such a wildcard may appear as:

```
<RIGHTS TEMPLATE>
    ...
    <USERS ALLOWED TO PUBLISH >
        <DEFINITION OF ALLOWED USERS>
            *@ABC
        </DEFINITION OF ALLOWED USERS>
        ...
    </USERS ALLOWED TO PUBLISH >
    ...
</RIGHTS TEMPLATE>
```

Similar types of wildcard uses may include 'M*@engineering@XYZ', i.e. all users with user names starting with M in an engineering department at company XYZ; '*@projectx@research@PDQ', i.e. all users on a project X in a research department at company PDQ; etc. Again, information as obtained by way of such a wildcard, variable, or the like should appear directly in an SRL 308 derived from the ORT 900, as necessary.

Typically, in constructing an SRL 308 based on an ORT 900, the ORT 900 including the signature S (PR-RM-T) thereof is placed within the rights label, and as such may be modified within the rights label by way of replacing references, variables, wildcards, and otherwise resolving rights data in the ORT 900 that can vary. Thereafter, and as set forth in connection with FIGS. 6A and 6B, the rights label with the modified rights data therein is submitted to an appropriate RM server 320 for signing to produce an SRL 308. Pseudo-code representative of such an SRL 308 may appear as:

```
<SIGNED RIGHTS LABEL>
    ...
    <TEMPLATE>
        [TEMPLATE INFO]
        <TEMPLATE SIGNATURE/>
    </TEMPLATE>
    ...
    [RIGHTS LABEL INFORMATION]
    <RIGHTS LABEL SIGNATURE/>
    ...
</SIGNED RIGHTS LABEL>
```

Thus, and as was alluded to above, the signature S (PR-RM-T) of the ORT 900 as appearing in the SRL 308 must be based on at least some parts of the rights data in the ORT 900 that do not vary. Otherwise, such signature S (PR-RM-T) will not verify such rights data as it appears in an SRL 308 derived from such ORT 900. However, absent any pre-defined arrangement, a verifier attempting to verify the signature S (PR-RM-T) likely has no idea which parts of the rights data are in fact the non-varying parts upon which the signature is based, and thus has no idea of how to in fact verify the signature.

Accordingly, in one embodiment of the present invention, the rights data appears in the ORT 900 and thus in the SRL 308 in a tagged format such as an extensible Markup Language (XML) format, where each part of the rights data that is the basis for the signature S (PR-RM-T) is marked as such. For example, each part of the rights data that is the basis can be marked with a special tag, or can be marked with a tag having a special attribute. Pseudo-code representing such ORT 900 with marked parts may appear as:

```
<RIGHTS TEMPLATE>
    ...
    <PUBLISHING SERVERS>
        <SERVER 1, marked=yes>
            ...
        </SERVER 1>
        <SERVER 2>
            ...
        </SERVER 2>
        ...
        <RULES, marked=yes>
            ...
        </RULES>
    </PUBLISHING SERVERS >
    ...
</RIGHTS TEMPLATE>
```

As should now be appreciated, to verify the signature S (PR-RM-T) in the SRL 308, then, a verifier need only identify each part of the rights data in the SRL 308 that is marked as being the basis for the signature S (PR-RM-T), retrieve such marked parts and appropriately concatenate same to form a signature block, and then employ such signature block to verify the signature S (PR-RM-T). Of course, concatenating the marked parts may be done in any appropriate manner without departing from the spirit and scope of the present invention. For example, such concatenating may be by order of appearance of each marked part within the SRL 308.

Figure 11:
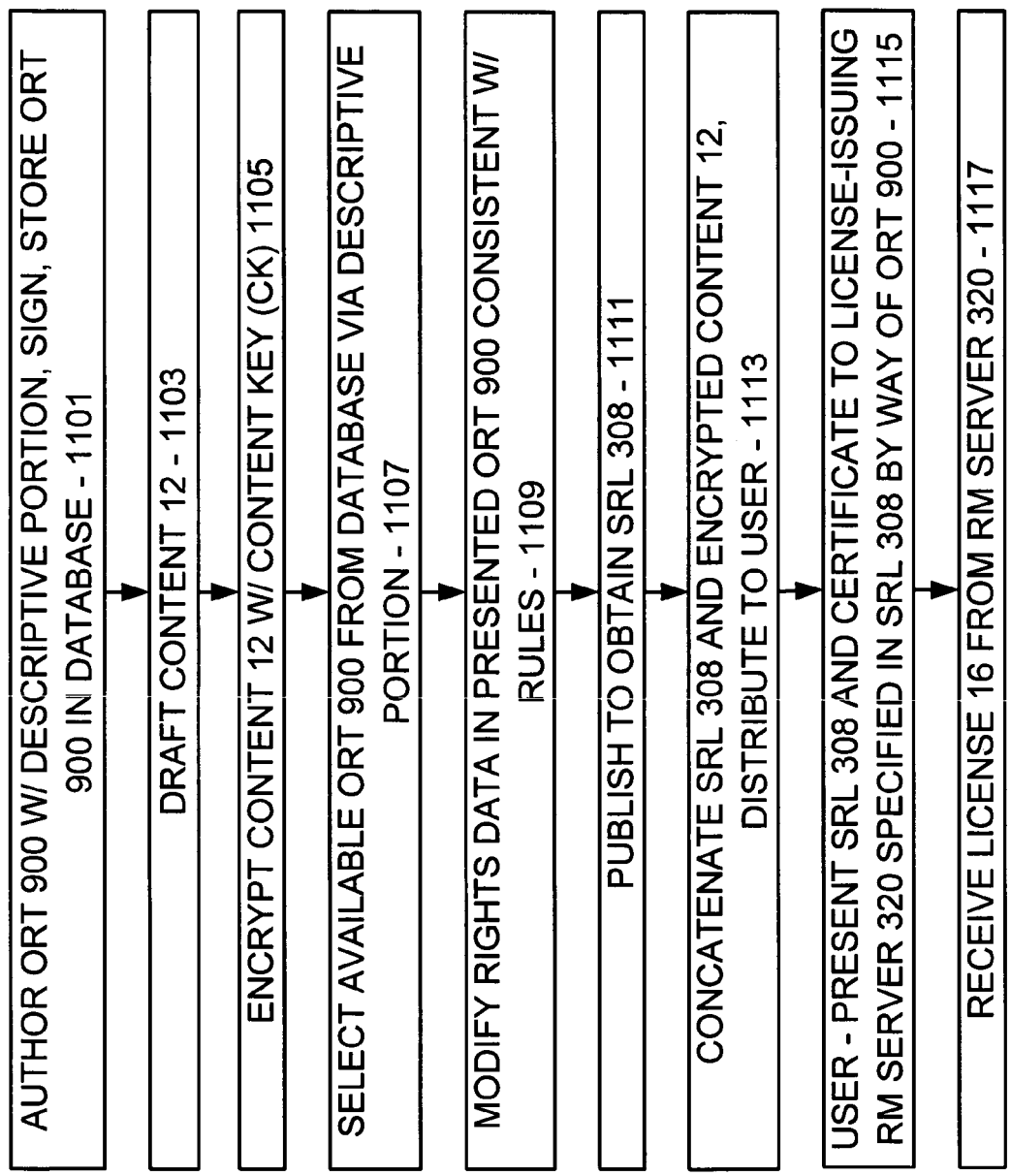
FIG. 11 is a flow chart showing key steps performed in creating and employing a flexible rights template in accordance with one embodiment of the present invention.

With the flexible ORT 900 as disclosed, and turning now to FIG. 11, creation of an SRL 308 and a license 16 based thereon may be performed in a manner akin to the following. Preliminarily, the ORT 900 is itself authored by an appropriate entity within an organization and is appropriately located within a database or the like such that the ORT 900 is potentially accessible to any publisher who wishes to publish based on such ORT 900 (step 1101). For example, such ORT 900 may grant rights to any user in a legal department of a company WBPA (i.e., *@legal@WBPA), may allow the publisher to specify any rights for each such user and any conditions for each such right, may define all executive members of such legal department (i.e., *@exec@legal@WBPA) as being able to publish based on such ORT 900, and may specify three particular RM servers 320 for issuing licenses 16 as identified by respective public keys (PU1-RM), (PU2-RM), (PU3-RM). The ORT 900 as stored in the database or the like should include a descriptive portion setting forth a description of the features of the ORT 900, perhaps in a manner akin to that just above. In the course of authoring the ORT 900, the author thereof appropriately marks parts of the rights data therein that should not be modified, and then signs the ORT 900 based on such marked parts of the rights data to result in a digital signature that is included with such ORT 900.

Thereafter, an author drafts some sort of content 12 and decides to publish such authored content 12 (step 1103). Accordingly, such author, who is now acting as a publisher, encrypts the content 12 with a content key (CK) (step 1105), looks in the aforementioned database or the like for one or more ORTs 900 of interest, and presumably based on the descriptive portion of each ORT 900 the author/publisher selects an appropriate ORT 900 for use thereby (step 1107). In one embodiment of the present invention, each ORT 900 in the database or the like is displayed to the publisher, but only if the publisher is defined within the ORT 900 as being able to use same. Thus, and with regard to the example ORT 900 set forth above, such ORT 900 will appear to the publisher only if such publisher is an executive member of the legal department of company WBPA, and correspondingly the publisher can only use such ORT 900 if such publisher is an executive member of the legal department of company WBPA. Otherwise, the publisher must use another ORT 900, presuming that another ORT 900 satisfies the publishing needs of such publisher.

Presuming now that the example ORT 900 set forth above is in fact available for use by the publisher, the ORT 900 is presented to the publisher and the publisher is then given the opportunity to modify the rights data therein consistent with the rules and restrictions incumbent in the ORT 900 (step 1109). Thus, based on the example ORT 900 set forth above, the publisher may select any of one or more users in the legal department of the company WBPA as recipients of rights and may select any rights for each such user and any conditions for each such right.

Once the author finishes modifying the rights data from the ORT 900, the publisher then publishes based on such modified rights data in a manner akin to that which was set forth above (step 1111). Here, it is to be appreciated that the modified rights data from the ORT 900 and the signature from the ORT 900 are placed into a rights label along with the content key (CK) encrypted according to each of (PU1-RM), (PU2-RM), and (PU3-RM) to produce (PU1-RM(CK)), (PU2-RM(CK)), and (PU3-RM(CK)), and perhaps other data, and the rights label is then sent to an appropriate RM server for signing to produce an SRL 308 based thereon. Thereafter, the publisher concatenates the SRL 308 and the encrypted content 12 to form a package 13, and duly distributes the package 13 with the encrypted content 12 to one or more users (step 1113).

Upon receipt of the package 13 and wishing to render the content 12 therein, a particular user presents the SRL 308 of the package 13 and an appropriate certificate to one of the three particular license-issuing RM servers 320 specified in the SRL 308 by way of the ORT 900, as identified by the respective public keys (PU1-RM), (PU2-RM), (PU3-RM) (step 1115), and if appropriate the user receives a license 16 from the RM server 320 (step 1117). As should be understood, the granting RM server 320 issues such license only if the signature of the SRL 308 verifies and only if the signature of the ORT 900 as placed in the SRL 308 also verifies, where the signature of the ORT 900 is verified against rights data appropriately marked within the SRL 308. As should also be understood, the granting RM server 320 replaces (PUx-RM (CK)) within the SRL 308 with a public key of the user (PU-USER) encrypting (CK) to form (PU-USER(CK)), where (PU-USER) is obtained from the presented certificate. Of course, presuming the license 16 grants rights to the user to render the content 12 in the manner sought, the user in fact renders such content 12 based on such license 16.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

Thus, there have been described systems and methods for issuing usage licenses for digital content and services via a signed rights label. Those skilled in the art will appreciate that numerous changes and modifications can be made to the preferred embodiments of the invention, and that such changes and modifications can be made without departing from the spirit of the invention. It is intended, therefore, that the appended claims cover all such equivalent variations as fall within the true spirit and scope of the invention.

In the foregoing description, it can be seen that the present invention comprises a new and useful architecture and method that allows the controlled rendering or playing of arbitrary forms of digital content 12, where such control is flexible and definable by the content owner/developer of such digital content 12. The architecture allows and facilitates such controlled rendering, especially in an office or organization environment or the like where documents are to be shared amongst a defined group of individuals or classes of individuals. The architecture also provides a publisher of digital content 12 within such an environment with a pre-defined template/ORT 900 specifying users and rights of such users with respect to such digital content, where the template/ORT 900 is flexible in nature.

APPENDIX 1

Sample Rights Data

```
<?xml version="1.0" ?>
<XrMLversion="1.2">
    <BODY type="Rights Template">
        <DESCRIPTOR>
            <OBJECT>
                <ID type="GUID">c43 . . . </ID>
                <NAME>$$411$411name$411desc</NAME>
            </OBJECT>
        </DESCRIPTOR>
        <WORK>
            <OBJECT>
                <ID/>
            </OBJECT>
            <RIGHTSGROUP name="MAIN RIGHTS">
                <RIGHTSLIST>
                    <VIEW>
                        <USERLIST>
                            <ACCESS>
                                <PRINCIPAL>
                                    <OBJECT>
                                        <ID />
                                        <NAME>test@company.com</NAME>
                                    </OBJECT>
                                </PRINCIPAL>
                            </ACCESS>
                        </USERLIST>
                    </VIEW>
                    <RIGHT name="generic">
                        <USERLIST>
                            <ACCESS>
                                <PRINCIPAL>
                                    <OBJECT>
                                        <ID />
                                        <NAME>test@company.com</NAME>
                                    </OBJECT>
                                </PRINCIPAL>
                            </ACCESS>
                        </USERLIST>
                    </RIGHT>
                </RIGHTSLIST>
            </RIGHTSGROUP>
        </WORK>
    </BODY>
    <SIGNATURE>
        <ALGORITHM>RSA PKCS#1-V1.5</ALGORITHM>
        <DIGEST>
            <ALGORITHM>SHA1</ALGORITHM>
            <PARAMETER name="codingtype">
                <VALUE encoding="string">surface-coding</VALUE>
            </PARAMETER>
            <VALUE encoding="base64" size="160">Mwl . . . =</VALUE>
        </DIGEST>
        <VALUE encoding="base64" size="1024">Msi . . . =</VALUE>
    </SIGNATURE>
</XrML>
```

APPENDIX 2

Sample Signed Rights Label (SRL) 308

```
<?xml version="1.0" ?>
<XrML version="1.2">
    <BODY type="Rights Label" version="3.0">
        <ISSUEDTIME>2002-01-01_12:00:00</ISSUEDTIME>
        <DESCRIPTOR>
            <OBJECT>
                <ID />
                <NAME>$$409$ . . . </NAME>
            </OBJECT>
        </DESCRIPTOR>
        <ISSUER>
            <OBJECT type="RM-Server">
                <ID type="GUID">{d81 . . . }</ID>
                <NAME>Test RM Server</NAME>
```

APPENDIX 2-continued

Sample Signed Rights Label (SRL) 308

```
            <ADDRESS type="URL">http://licensing.dev.com</ADDRESS>
        </OBJECT>
        <PUBLICKEY>
            <ALGORITHM>RSA</ALGORITHM>
            <PARAMETER name="public-exponent">
                <VALUE encoding="integer32">65537</VALUE>
            </PARAMETER>
            <PARAMETER name="modulus">
                <VALUE encoding="base64" size="1024">
                NcO . . . =</VALUE>
            </PARAMETER>
        </PUBLICKEY>
        <ENABLINGBITS type="sealed-key">
            <VALUE encoding="base64" size="1024">tFg . . . =</VALUE>
        </ENABLINGBITS>
        <SECURITYLEVEL name="Server-Version" value="2.0" />
        <SECURITYLEVEL name="Server-SKU" value="22222-3333" />
    </ISSUER>
    <DISTRIBUTIONPOINT>
        <OBJECT type="LICENSE ACQUISITION URL">
            <ID type="GUID">{OF4 . . . }</ID>
            <NAME>RM Server Cluster</NAME>
            <ADDRESS type="URL">http://localhost/Licensing</ADDRESS>
        </OBJECT>
    </DISTRIBUTIONPOINT>
    <WORK>
        <OBJECT type="TEST-FORMAT">
            <ID type="MYID">FDB-1</ID>
        </OBJECT>
        <METADATA>
            <SKU type="PIDTYPE">PID</SKU>
        </METADATA>
        <PRECONDITIONLIST>
            <TIME />
        </PRECONDITIONLIST>
    </WORK>
    <AUTHDATA name="Encrypted Rights data">PAB . . . </AUTHDATA>
</BODY>
<SIGNATURE>
    <ALGORITHM>RSA PKCS#1-V1.5</ALGORITHM>
    <DIGEST>
        <ALGORITHM>SHA1</ALGORITHM>
        <PARAMETER name="codingtype">
            <VALUE encoding="string">surface-coding</VALUE>
        </PARAMETER>
        <VALUE encoding="base64" size="160">Prc . . . =</VALUE>
    </DIGEST>
    <VALUE encoding="base64" size="1024">EHd . . . =</VALUE>
</SIGNATURE>
</XrML>
```

The invention claimed is:

1. A method of publishing digital content to enable a license server to issue a digital license corresponding to the content to one or more users desiring to render the content, the method comprising:

encrypting the content according to a content key (CK) to result in (CK(content));

protecting the content key (CK) according to a public key for the license server (PU-RM);

retrieving a rights template, the rights template comprising information identifying a pre-defined set of users, pre-defined rights for each defined user, and pre-defined use conditions, the rights template adapted for repeated use in defining rights to a plurality of pieces of content;

retrieving rights data to be associated with the content from the retrieved rights template;

retrieving rules for modifying the retrieved rights data from the retrieved rights template;

modifying the retrieved rights data from the rights template according to the rules;

submitting the rights data and the protected content key (CK)) as a rights label to the license server for signing thereby, the license server validating the rights label and, if valid, creating a digital signature based on a private key (PR-RM) corresponding to (PU-RM) and based at least in part on the rights data to result in a signed rights label (SRL) and returning the SRL;

receiving the returned SRL and concatenating such received SRL with (CK(content)) to form a content package; and distributing the content package to the one or more users, whereby a user desiring to render the content retrieves the SRL from the content package and submits the retrieved SRL to the license server as part of a request for the license corresponding to the content, whereby the license server verifies the signature of the SRL based on (PU-RM) and based at least in part on the protected rights data, accesses the rights data in the SRL and reviews same to determine whether the user is entitled to the license, and if so issues the license to the user, the license including (CK) in a protected form accessible to the user.

2. The method of claim 1 comprising
retrieving rights data from the retrieved rights template including a set of users, any rights granted to each user, and any conditions on each right, and retrieving rules from the retrieved rights template for modifying the users, rights, and conditions of the rights data; and
modifying the users, rights, and conditions of the rights data from the rights template according to the rules.

3. The method of claim 2 comprising retrieving rights data from the retrieved rights template including a user that may not be removed from the rights data.

4. The method of claim 1 wherein the rights template specifies therein one or more users that can employ the rights template to publish, the method comprising a particular user retrieving the rights template only if such particular user is specified therein as being among the users that can employ such rights template to publish.

5. The method of claim 1 comprising:
retrieving rights data to be associated with the content from the retrieved rights template, the retrieved rights data including a reference to information stored elsewhere;
retrieving the information stored elsewhere based on the reference; and
modifying the retrieved rights data from the rights template to replace the reference with the retrieved information.

6. The method of claim 1 comprising:
retrieving rights data to be associated with the content from the retrieved rights template, the retrieved rights data including information represented by way of a variable; and
modifying the retrieved rights data from the rights template to replace the variable with one or more pieces of information corresponding thereto.

7. The method of claim 6 comprising:
retrieving rights data to be associated with the content from the retrieved rights template, the retrieved rights data including a class of users represented by way of a variable; and
modifying the retrieved rights data from the rights template to replace the variable with one or more users of the class represented by way of such variable.

8. A method of publishing digital content for enabling multiple license servers to issue a digital license corresponding to the content to one or more users desiring to render the content, the method comprising:
encrypting the content according to a content key (CK) to result in (CK(content));
retrieving a rights template, the rights template comprising a information identifying a pre-defined set of users, pre-defined rights for each defined user, and pre-defined use conditions, the rights template adapted for repeated use in defining rights to a plurality of pieces of content;
retrieving rights data to be associated with the content from the retrieved rights template;
retrieving from the rights data a public key (PUx-RM) of each license server that is to be enabled to issue the license;
protecting the content key (CK) according to the public key for each enabled license server (PUx-RM) to result in (PUx-RM(CK)) for each enabled license server;
submitting the rights data and (PUx-RM(CK)) for each enabled license server as a rights label to the license sewer for signing thereby, the license server validating the rights label and, if valid, creating a digital signature based at least in part on the rights data to result in a signed rights label (SRL) and returning the SRL;
receiving the returned SRL and concatenating such received SRL with (CK(content)) to form a content package; and
distributing the content package to the one or more users, whereby a user desiring to render the content retrieves the SRL from the content package and submits the retrieved SRL to one of the enabled license servers as part of a request for the license corresponding to the content, whereby the enabled license server verifies the SRL, accesses the rights data in the SRL and reviews same to determine whether the user is entitled to the license, and if so retrieves the (PUx-RM(CK)) from the rights data corresponding to such license server, retrieves (CK) therefrom, and issues the license to the user, the license including (CK) in a protected form accessible to the user.

9. The method of claim 8 wherein the retrieved rights data identifies multiple license servers for issuing the SRL, the method comprising:
retrieving from the rights data the multiple license servers;
selecting one of the multiple license servers; and
submitting the rights data and the protected content key (CK)) as a rights label to the selected license server for signing thereby.

10. A method of publishing digital content to enable a license server to issue a digital license corresponding to the content to one or more users desiring to render the content, the method comprising:
encrypting the content according to a content key (CK) to result in (CK(content));
protecting the content key (CK) according to a public key for the license server (PU-RM);
retrieving a rights template, the rights template comprising a information identifying a pre-defined set of users, pre-defined rights for each defined user, and pre-defined use conditions, the rights template adapted for repeated use in defining rights to a plurality of pieces of content;
retrieving rights data to be associated with the content from the retrieved rights template;
retrieving from the rights data an identification of multiple publishing servers;
selecting one of the multiple publishing servers;
submitting the rights data and the protected content key (CK)) as a rights label to the selected publishing server for signing thereby, the publishing server validating the rights label and, if valid, creating a digital signature based at least in part on the rights data to result in a signed rights label (SRL) and returning the SRL;
receiving the returned SRL and concatenating such received SRL with (CK(content)) to form a content package; and
distributing the content package to the one or more users, whereby a user desiring to render the content retrieves the SRL from the content package and submits the retrieved SRL to the license server as part of a request for the license corresponding to the content, whereby the license server verifies the signature of the SRL based on (PU-RM) and based at least in part on the protected rights data, accesses the rights data in the SRL and reviews same to determine whether the user is entitled to the license, and if so issues the license to the user, the license including (CK) in a protected form accessible to the user.

11. A method of producing a rights template from which digital content is to be published to enable a license server to issue a digital license corresponding to the content to one or more users desiring to render the content, the method comprising:

defining within the rights template a pre-defined set of users, pre-defined rights data for each defined user associated with a plurality of pieces of content, and rules for modifying the rights data, the rights template adapted for repeated use in defining rights to a plurality of pieces of content;

identifying parts of the rights data that are not modified based on the rules and marking at least some of the identified parts with a tag having a marking attribute set; and signing the rights template based on the marked parts of the rights template to produce a digital signature, whereby a publisher publishing the content may modify the rights data of the template in accordance with the rules but is not expected to modify the marked parts of the template and therefore should not prevent the digital signature from verifying.

* * * * *